(12) United States Patent
Rentzepis et al.

(10) Patent No.: US 6,432,610 B1
(45) Date of Patent: Aug. 13, 2002

(54) DYE PRECURSOR MOLECULES CHEMICALLY REACTIVE WITH THE LIGHT-ALTERED FORM OF LIGHT-SENSITIVE MOLECULES TO FORM STABLE FLUORESCENT DYE, PARTICULARLY FOR OPTICAL MEMORIES INCLUDING TWO-PHOTON THREE-DIMENSIONAL OPTICAL MEMORIES

(75) Inventors: Peter M. Rentzepis; Alexander Dvornikov, both of Irvine, CA (US)

(73) Assignee: Regents of the University of California, Oakland, CA (US)

( * ) Notice: Subject to any disclaimer, the term of this patent is extended or adjusted under 35 U.S.C. 154(b) by 0 days.

(21) Appl. No.: 09/391,281

(22) Filed: Sep. 7, 1999

Related U.S. Application Data

(60) Provisional application No. 60/099,514, filed on Sep. 8, 1998.

(51) Int. Cl.[7] ................................................. G03C 1/72
(52) U.S. Cl. ................. 430/270.15; 430/337; 430/338; 430/346; 430/945; 522/22; 522/23
(58) Field of Search ..................... 430/945, 19, 270.15, 430/337, 338, 346; 522/22, 23

(56) References Cited

U.S. PATENT DOCUMENTS

| | | | | |
|---|---|---|---|---|
| 3,525,616 A | * | 8/1970 | Hackmann et al. | 430/338 |
| 4,343,885 A | * | 8/1982 | Reardon, Jr. | 430/338 |
| 4,346,186 A | * | 8/1982 | Garrett et al. | 524/82 |
| 4,643,588 A | * | 2/1987 | Postle et al. | 374/160 |
| 4,659,649 A | * | 4/1987 | Dickinson et al. | 430/338 |
| 4,923,781 A | * | 5/1990 | Fujikura et al. | 430/345 |
| 5,185,233 A | * | 2/1993 | Santo | 430/945 |
| 5,221,590 A | * | 6/1993 | Bugner | 430/56 |

FOREIGN PATENT DOCUMENTS

| | | | |
|---|---|---|---|
| EP | 0146411 | * | 6/1985 |
| EP | 0175238 | * | 3/1986 |
| EP | 0290750 | * | 11/1988 |
| JP | 62-161860 | * | 7/1987 |

OTHER PUBLICATIONS

Dvornikov, A.S., et al., Materials and Systems for Two Photon 3–D ROM Devices, IEEE Trans. Componen., Packag., Manufac. Technol., Part A, vol. 20(2) pp. 203–212, Jun. 1997.*

Seltzer, R., "Indicator for Parishable Producs developed.", C&E News, vol. 64(39), pp. 77–78, Sep. 1986.*

* cited by examiner

*Primary Examiner*—Martin Angebrannt
(74) *Attorney, Agent, or Firm*—Fuess & Davidenas

(57) ABSTRACT

Dye precursor molecules—normally rhodamine base—held in a transparent matrix are reactive with acids, bases, ions or radicals—and in the case of rhodamine are reactive with acids—to produce dye molecules—i.e., rhodamine—having markedly different spectroscopic properties. Light-sensitive molecules-normally a compound of ortho-nitro-aldehyde, in particular o-nitro-benzaldehyde or, preferably, 1-nitro-2-naphthaldehyde—in the same matrix undergo photochemical reaction when selectively exposed to light so as to form at least one of the acids, bases, ions or radicals with which the dye precursor molecules are reactive—preferably nitroso acid. Chemical reaction of rhodamine base dye precursor molecules with photochemically produced nitroso acid within domains that are radiatively-selected two-dimensionally or within voxels that are radiatively-selected three-dimensionally, by first-frequency "write" radiation—including as may be realized by two-photon absorption—produces stable rhodamine dye in the radiatively-selected domains/voxels. Subsequent illumination with a single, second-frequency "read" radiation induces strong fluorescence in the dye of the written domains/voxels while leaving all chemicals/photochemicals unchanged. The induced fluorescence may be imaged to a detector, such as a charge coupled device (CCD), to reliably realize a high signal-to-noise, non-degrading, optical memory of the write once, read many (WORM) type.

1 Claim, 11 Drawing Sheets

Table 1.

| Solvent | Quantum Yield |
|---|---|
| EPA | 0.5 ; 0.1 [a] |
| acetonitrile | 0.48 |
| 1,2-dichloroethane | 0.49 |
| 3-methylpentane | 0.50 ; 0.04 [a] |
| Me-cyclohexane | 0.46 ; 0.04 [a] |
| cyclohexane | 0.53 |

Figure 9

Table 2.

| Solvent | k, s$^{-1}$ ($\tau$, ns) ± 10% [c] |
|---|---|
| benzene [a] | 2.0x10$^7$ ; (50) |
| 1,2-dichloroethane [a] | 6.7x10$^6$ ; (150) |
| i-PrOH [a] | 5.0x10$^6$ ; (200) |
| CH$_3$CN [a] | 3.1x10$^6$ ; (320) |
| CH$_3$CN+H$_2$O (1:1) [a] | 1.6x10$^6$ ; (625) |
| EPA [b] | 15.3 ; (65 ms) |

DYE PRECURSOR MOLECULES CHEMICALLY REACTIVE WITH THE LIGHT-ALTERED FORM OF LIGHT-SENSITIVE MOLECULES TO FORM STABLE FLUORESCENT DYE, PARTICULARLY FOR OPTICAL MEMORIES INCLUDING TWO-PHOTON THREE-DIMENSIONAL OPTICAL MEMORIES

REFERENCE TO A RELATED PATENT APPLICATION

The present utility patent application is descended from U.S. provisional patent application Ser. No. 60/099,514 filed Sept. 8, 1998, for PHOTOREARRANGEMENT MECHANISM OF 1-NITRO-2-NAPHTHALDEHYDE AND ITS APPLICATION TO OPTICAL STORAGE MEMORY [sic]. The contents of the related patent application is incorporated herein by reference.

This invention was made by support of the U.S. Government under Contracts Nos. F30602-97-C-0029 and F-30602-93-C-0232 acting through the United States Air Force, Rome Laboratory. The U.S. Government has certain rights in this invention.

BACKGROUND OF THE INVENTION

1. Field of the Invention

The present invention generally concerns (i) photochemical, and chemical, processes for the storage and the readout, by radiation of information within an optical memory, particularly such processes as make the optical memory to be of the write-once read-many, or WORM, type, and (ii) chemicals and photochemicals by which the WORM processes may be realized.

The present invention particularly concerns chemical and photochemical admixtures, suitable for use in optical memories, including both (i) dye precursor molecules, and (ii) light-sensitive molecules.

2. Description of the Prior Art

2.1 Related Prior Patents by One of the Co-Inventors of the Present Invention Two previous patents to the selfsame Peter Rentzepis who is a co-inventor of the present invention are generally relevant in background to the present invention for teaching, inter alia, two-two-photon absorption, and the challenge of writing and reading an optical memory so that all changes are absolutely local as and when intended, and so that the written memory is stable.

U.S. Pat. No. 5,268,862 for a THREE-DIMENSIONAL OPTICAL MEMORY to the selfsame P. Rentzepis who is a co-inventor of the present application concerns an active medium, typically a photochromic material and more typically spirobenzopyran, maintained in a three-dimensional matrix, typically of polymer, and illuminated in selected regions by two laser light beams, typically of 532 nm and 1064 nm wavelength, to change from a first, spiropyran, to a second, merocyanine, stable molecular isomeric form by process of two-photon absorption. Regions not temporally and spatially coincidentally illuminated are unchanged. Later illumination of the selected regions by two red laser light beams, typically of 1064 nm wavelength each, causes only the second, merocyanine, isomeric form to fluoresce. This fluorescence is detectable by photodetectors as stored binary, data. The three-dimensional memory may be erased by heat, or by infrared radiation, typically 2.12 microns wavelength. Use of other medium permit the three-dimensional patterning of three-dimensional forms, such as polystyrene polymer solids patterned from liquid styrene monomer or by extrusion molding. Three-dimensional displays, or other patterns, can also be created.

U.S. Pat. No. 5,325,324 to Rentzepis, et. al. for a THREE-DIMENSIONAL OPTICAL MEMORY teaches selected domains, normally $10^3*10^3$ such domains arrayed in a plane, within a three-dimensional (3-D) volume of active medium, typically 1 cm$^3$ of spirobenzopyran containing $10^2$ such planes, are temporally and spatially simultaneously illuminated by two radiation beams, normally laser light beams in various combinations of wavelengths 532 nm and 1064 nm, in order, dependent upon the particular combination of illuminating light, to either write binary data to, or read binary data from, the selected domains by process of two-photon (2-P) absorption. One laser light beam is preferably directed to illuminate all domains of the selected plane. The other laser light beam is first spatially encoded with binary information by 2-D SLM, and is then also directed to illuminate the domains of the selected plane. Direction of the binary-amplitude-encoded spatially-encoded light beam is preferably by focusing, preferably in and by a holographic dynamic focusing lens (HDFL). During writing the selected, simultaneously illuminated, domains change their isomeric molecular form by process of 2-P absorption. During reading the selected domains fluoresce dependent upon their individually pre-established, written, states. The domains' fluorescence is focused by the HDFL, and by other optical elements including a polarizer and polarizing beam splitter, to a $10^3*10^3$ detector array. I/O bandwidth to each cm$^3$ of active medium is on the order of 1 Gbit/sec to 1 Tbit/sec.

2.2 Diverse Prior Patents Describe Chemicals and Photochemicals of Use in Optical Memories Diverse prior patents describe chemicals and photochemicals of use in optical memories.

For example, U.S. Pat. No. 5,592,461 to Tsujioka, et. al. for METHODS OF RECORDING AND REPRODUCING INFORMATION USING AN OPTICAL RECORDING MEDIUM describes an optical recording medium with a masking layer on a side of a recording layer for receiving a reproducing beam. The masking layer is prepared from that containing photochromic dye molecules having absorption, at the wavelength of the reproducing beam and causing a photon mode reaction by absorbing the reproducing beam to be reduced in absorption.

As an example of a patent making a use—different from what the use of the present invention will be seen to be—of a dye—different from what the preferred dye of the present invention will be seen to be—U.S. Pat. No. 5,648,135 to Watanabe, et. al. for an INFORMATION RECORDING MEDIUM HAVING RECORDING LAYER WITH ORGANIC POLYMER AND DYE CONTAINED THEREIN concerns an information recording medium having a recording layer which comprises a composition. The composition contains (1) at least one organic polymer selected from the group consisting of: (a) conjugated polymers whose conformations change by thermal energy, for example, polythiophene, and (b) polymers containing as a component a diene monomer and/or an aromatic-ring-containing vinyl monomer, for example, polystyrene; and (2) a dye having light-absorbing ability, for example, naphthalocyanine. Despite the recording layer is of the organic type that features non-toxicity and low manufacturing cost as advantages, the recording layer makes it possible to produce a rewritable optical disc which can be recorded by a semiconductor laser (830–780 nm) employed widely.

More recently, U.S. Pat. No. 5,253,198 for a THREE-DIMENSIONAL OPTICAL MEMORY to Birge, et al. concerns a high density rapid access data storage device employs a volume of field-oriented bacteriorhodopsin in a polymer medium, and contained in a vessel that can be accurately displace in three dimensions. X-axis and Y-axis laser illumination systems each converge a beam in the respective direction at a location at which a particular bit cell is to have a "1" or "0" recorded or is to be interrogated. Both laser systems are pulsed on at one wavelength to write a "1" or at a second wavelength to write a "0". After writing, a cleaning step is carried out by actuating the laser systems non-simultaneously at the other of the wavelengths to remove any undesired photochemistry from adjacent bit cells. A read cycle involves actuating two or four lasers, and then discriminating the "1" or "0" state from the electrical signal generated by the medium.

2.3 The Prior Patents Of Swainson, et al.

A series of early patents to Swainson, et al. contemplate various means of inducing changes in three-dimensional, volume, memories by radiation beams, and optical detection of the changes so made—ergo, three-dimensional displays and optical memories. The fifth, and last, Swainson patent discussed hereinafter is possibly of greatest relevance to the present invention.

U.S. Pat. No. 4,041,476 to Swainson concerns a METHOD, MEDIUM AND APPARATUS FOR PRODUCING THREE-DIMENSIONAL FIGURE PRODUCT in which a three-dimensional figure is formed in situ in a medium having two active components by causing two radiation beams to intersect in the media. The dissimilar components are selected to respond to the simultaneous presence of the beam and to either react or to produce reactants which render the intersection of the beams physically sensible or distinguishable. The beams trace surface elements of the figure to be produced.

U.S. Pat. No. 4,238,840 to Swainson for a METHOD, MEDIUM AND APPARATUS FOR PRODUCING THREE DIMENSIONAL FIGURE PRODUCT concerns a method, apparatus and product in which a three-dimensional figure is formed in situ in a medium having two active components by causing two radiation beams to intersect in the media. The dissimilar components are selected to respond to the simultaneous presence of the beams and to either react or to produce reactants which render. the intersection of the beams physically sensible or distinguishable. The beams trace surface elements of the figure to be produced.

U.S. Pat. No. 4,288,861 to Swainson, et al., for THREE-DIMENSIONAL SYSTEMS concerns systems where a multiple beam or "multiphoton" absorption effect is used for creating three-dimensional sensible objects including optical elements and three-dimensional computer-type data storage and retrieval systems. The objects and systems are made by at least two beams of optical electromagnetic radiation having a spectral characteristic matched to the excited state properties of active media molecules, wherein the beams are simultaneously or sequentially directed to a common target location to effect a desired photochemical reaction. The first beam effects excitation at the target locations such that the coincidence of the second beam and absorption thereof by the individual molecules at the target location effects a controlled chemical reaction causing a change in physical or refractive index characteristics, or in other words, production of physical or refractive index inhomogeneities.

U.S. Pat. No. 4,333,165 to Swainson, et al., for THREE-DIMENSIONAL PATTERN MAKING METHODS concerns method and active media for controlled production of physical and refractive index inhomogeneities in a volume of a suspension medium by use of at least two intersecting beams of electromagnetic radiation matched to the excited state properties of molecules in the media. In addition, complex three-dimensional physical and chemical structures are produced by selective excitation of different types of molecules in the media and by employing transportive capabilities of liquid or gaseous support medium.

U.S. Pat. No. 4,466,080 to Swainson, et. al., for THREE-DIMENSIONAL PATTERNED MEDIA concerns method and active media for controlled production of physical and refractive index inhomogeneities in a volume of a suspension medium by use of at least two intersecting beams of electromagnetic radiation matched to the excited state properties of molecules in the media . In addition, complex three-dimensional physical and chemical structures are produced by selective excitation of different types of molecules in the media and by employing transportive capabilities of liquid or gaseous support medium.

Finally, U.S. Pat. No. 4,471,470 to Swainson, et. al., for a METHOD AND MEDIA FOR ACCESSING DATA IN THREE DIMENSIONS concerns methods and active media for controlled production and optical access of data in the form of physio-chemical inhomogeneities, such as controlled differences in absorption characteristics of molecules at selected regions. The methods involve use of at least two intersecting beams of radiation which are matched to selected optical properties of the active media. In a specific embodiment a bit of data at a selected portion of a region of active media is accessed by (i) directing a first beam having a first electromagnetic radiation characteristic matched to a first optical characteristic of the media at the region to change the condition of the media to a second characteristic which is of either low or high optical reactivity, depending upon the bit value at programmed portions of the region—the second characteristic being relative to a second radiation characteristic other than the first radiation characteristic—and then (ii) directing a second beam matched to the second electromagnetic radiation characteristic to intersect the region at a selected portion containing the bit of data to be accessed, therein to permit optical sensing of the state of the bit.

In general the prior art patents of Swainson, et al. contemplate different ways, including by combinatorial chemistry, to get such copious radiation energy into selected domains of an optical memory store as causes changes at these selected domains, and not elsewhere. The present invention will be seen to be distinguished in that selective delivery of energy into the optical memory store for writing, and the use of energy which may have some "spill-over" to unaddressed regions for reading, are not primary concerns, and present no special problem. Instead, the present invention will be seen to radiatively effect (selective) change within an optical memory store by a combination of (i) photochemistry and (ii) chemistry.

SUMMARY OF THE INVENTION

The present invention contemplates (i) dye precursor molecules that are chemically reactive with the light-altered form of (ii) light-sensitive molecules to form (iii) stable fluorescent dye, particularly for use in optical memories including two-photon three-dimensional optical memories.

The (i) dye precursor molecules and (ii) light-sensitive molecules present in combination a combined (1) photochemical and (2) chemical process for the storage of information within an optical memory. The preferred process makes the optical memory to be of the write-once read-many, or WORM, type.

The present invention also contemplates certain photochemicals and chemicals by which preferred (i) dye precursor molecules and (ii) light-sensitive molecules, and a preferred WORM-type optical memory using these photochemicals and chemicals, may be realized.

1. A Chemical Admixture Suitable for Containment Within the Matrix of an Optical Memory.

The present invention is based on new photochemical and chemical admixtures suitably contained within a transparent matrix so as to implement the store of information. The information store is called an "optical memory". A complete optical memory also includes—as parts which are not the principle subject of the present invention—(i) radiation, normally laser light, sources to write and to read the store, (ii) means of impressing information on a radiation beam so as to selectively write selected portions of the store, and (iii) means of detecting information within radiation resulting from radiatively interrogating portions of the store that were previously radiatively written. The memory store may be either (i) substantially two-dimensionally planar (2-D) in a single layer, or (ii) three-dimensional (3-D) in a volume.

The-present, invention is thus primarily a photochemical/chemical invention—although the new photochemical/chemical admixtures present new, and slightly changed, (i) opportunities for structuring an optical memory, especially for reading, and (ii) techniques for radiatively and chemically manipulating (i.e., writing or reading or erasing), the selfsame optical memory store that the photochemical/chemical admixtures serve to create. For example, certain variants of the chemical/photochemical admixtures of the present invention may be—nonetheless to being retained within a three-dimensional matrix—radiatively read by but one single beam of radiation (i.e., read in a "one-photon" process). This is unusual: it means that when an entire "bit-plane" of the three-dimensional matrix is simultaneously illuminated with but the single radiation beam—which must necessarily be within the plane else other, un-selected, "bit planes" would undesirably be illuminated—then such problems as have heretofore normally accrued are totally voided. Namely, (i) the illuminating single radiation beam in its path will reliably interact with later-intersected bit domains (voxels) regardless of the written status of earlier-intersected bit domains, meanwhile that-(ii) any radiation-emissions induced in any illuminated bit domains will neither individually nor cumulatively disrupt the radiation interrogation (i.e., the reading) of all other domains. Simply put, a WORM optical memory store made from the photochemical/chemical admixtures of the present invention may be read (in parallel, one bit plane at a time) quite simply with but one single, radiation beam—a considerable simplification and advantage.

In accordance with the present invention, an admixture that is suitable for use in optical memories consists essentially of (1a) dye precursor molecules—these dye precursor molecules being reactive with at least one of (2a) acids (2b) bases, (2c) ions, at (2d) radicals and/or (2e) molecules (other than the dye precursor molecules, and only as are) in their excited states, to change into (1b) dye molecules having differing spectroscopic properties than do the (1a) dye precursor molecules, and (2) light-sensitive molecules that, when exposed to light, undergo photochemical reaction so as to form at least one of said (2a) acids, (2b) bases, (2c) ions, (2d) radicals and/or (2e) (other) molecules that are within excited states, with which the (2a)–(2e) molecules the (1a) dye precursor molecules are reactive.

Simply stated, dye precursor molecules—although not reactive with co-located light-sensitive molecules at times before these light-sensitive molecules are radiated—are chemically reactive with at least one of the acids, bases, ions, radicals and/or excited states that are photo-generated from these co-located light-sensitive molecules so as to change into dye molecules. Even more simply stated, consider—as is preferred—that the dye precursor molecules are sensitive to acid to change into dye molecules, while, correspondingly, the preferred light-sensitive molecules are sensitive to light to turn into an acid. In this preferred case the preferred dye precursor molecules—although not reactive with the co-located light-sensitive molecules at times before these light-sensitive molecules are radiated—are reactive with the acid that is photo-generated from the light-sensitive molecules so as to change into the dye molecules.

The admixture is held in a stable matrix that, nonetheless to its stability, permits of a very slight, molecular scale, chemical migration. This migration permits of the chemical combination of the photo-generated acids, bases, ions, radicals or excited molecules with the dye precursor molecules.

"Writing" a matrix containing the admixture is a straightforward matter of (i) radiatively illuminating selected domains, or voxels, with a first-frequency, "write" radiation (of plural radiations, collectively) so as to cause the light-sensitive molecules to undergo a photochemical reaction to photo-generate an acid, base, ion, radical and/or excited state (and most commonly and most simply, an acid), while (ii), permitting the locally-produced acid, base, ion radical and/or excited state to chemically react with the local dye precursor molecules to produce the dye molecules. Both (i) the radiatively-induced photochemical changes, and (ii) the chemical reaction, can be, and are, induced by one or more bright light beams. Writing can take some time, and greatly more time than reading. However, optical memories can be read very quickly, and with massive parallelism, as next discussed.

Clearly the selective, regional, formation of the dye is exactly how the memory store becomes radiatively written. However, it is just as important to know which chemical components of the admixture do not interact with the incident "write" radiation to photochemically change as to know which components do so photochemically change. The dye precursor molecules are transparent to a first-frequency, "write" radiation (or radiations, in combination), which "write" radiation affects only the light-sensitive molecules. For that matter, the dye molecules themselves—as have been formed from chemical reaction of the precursor molecules and the molecules photo-generated from the "write" radiation—are also unaffected by the write radiation. Namely, once a domain, or voxel, has been radiatively written, it is thereafter of no consequence nor any effect that it should be attempted to be "re-written"—which in fact does nothing—or that other domains should be written.

The fact that nothing will undergo photochemical—not chemical, but photochemical—transformation resultantly from the "write" radiation save only the light-sensitive molecules is of great benefit if first-frequency "write" radiation(s) can be selectively localized to only selected domains (or, for 3-D memory stores, to selected voxels). Localized writing of domains in a plane is obtained simply by selectively illuminating the plane from either side. Localized writing of voxels within a volume is more complex. However, by two-photon absorption occurring from two intersecting write radiation beams, a 3-D volume memory store can also be precisely and cleanly "written" in only selected voxels.

Each of (i) the dye precursor molecules, (ii) the dye molecules—as have been formed from chemical, reaction of the precursor molecules and the molecules photo-generated from the dye precursor molecules—and (iii) the light-sensitive molecules are substantially insensitive to change by incidence of a second-frequency, "read", radiation. This makes that an optical memory formed of these chemical components is "non-destructive readout". Namely, it can be read and re-read indefinitely: nothing will change. It also means that a memory store that is read in any and all portions (including in those portions not yet written, although by convention these portions will contain only binary "0") can still subsequently be written in any portions previously unwritten. In other words, reading does not "poison" the memory store for later writing.

Nonetheless to being substantially unaffected and substantially unchanged during reading, the dye molecules—which have differing spectroscopic properties than do the dye precursor molecules—are very strongly detectable responsively to this second-frequency, read, radiation in some one(s) of their (i) fluorescence, (ii) absorption or (iii) index of refraction properties.

The preferred dye molecules—which are present only in the "written" domains or voxels—are both (i) colored (which goes to both absorption and index of refraction, and is indeed why these molecules are called "dye"), and quite beneficially, (ii) fluorescent, to impinging second-frequency radiation. This "impinging radiation" is how the memory store is read. It is the induced fluorescence of the dye molecules which is preferably detected—as opposed to, for example, the selective coloration, or the selected opacity.

Note that even within a 3-D volume but one single read radiation beam can be applied longitudinally along an entire plane—a "bit plane"—to simultaneously (within the transit time of the light beam) excite to fluorescence all the dye molecules in all, the voxels in this bit plane. The selective fluorescence of the previously-written voxels can be detected orthogonally to the excited plane by a detector, such as a charge Coupled Device (CCD) or the like. Since (i) a single bit plane may contain many thousands, or even millions, of voxels (bits), and since (ii) the radiation-induced fluorescence is very fast, the optical memory store can clearly be efficiently repetitively non-destructively read of vast amounts of information at high speeds. Because (iii) the detectors also operate quickly, the entire optical memory can read information at very high data rates.

An optical memory store assembled with the preferred chemical and photochemical components of the present invention is thus of the write-once read-many, or WORM, type. Because the preferred radiation reading and writing is very "clean" in affecting only the selected domains, even 3-D forms of the optical memory do not "grey out" with use. It is, however, desirable to shield the memory and its contained photochemicals and chemicals from extraneous radiation, especially radiation in the write frequency range. To this end, the memory, store is commonly within a case, similarly to previous Winchester magnetic disks, or if housed in a removable cartridge then the cartridge is commonly again contained in a case or envelope, again like removable-media Winchester magnetic disks.

2. Optical Properties of the Chemical Admixture, and Its Derivatives

The chemical admixture of the present invention, and its derivatives, are related in their, optical-properties in a very particular, and useful, way.

Consider de-novo writing of a virgin memory store. In-greater detail, the (un-reacted) dye precursor molecules are colorless and transparent to, and unreactive with radiation(s). within a particular first range of frequencies. However, the light-sensitive molecules react with, and form an acid, a base, ions or radicals, in response to radiation, or combined radiations, within this first range of frequencies. This is relationship number one appropriate "write" radiation(s) charges the light-sensitive molecules but is (are) without (direct) effect on the dye pre-cursor molecules, which are completely unaffected (in any permanent way) by the first-frequency radiation(s). Common first-frequency radiation(s) is (are), by way of example, in a range at least as broad as 430 to 670 nanometers wavelength.

Now consider writing a memory store in different addressable regions at different times, possibly at times that are considerably separated. For an admixture—i.e., a memory store—that is already radiatively changed in some region(s) while being unchanged in other regions—such as might commonly occur in a 3-D volume memory store—a later application of the first-frequency "write" radiation(s) (i.e., a radiation of the nominal 430–670 nanometers wavelength (s)) will not change any dye molecules already then existing. Furthermore, the dye molecules are transparent to this (these) (particular) radiation(s)—as were the dye precursor molecules before them. This is a second relationship: the dye molecules are both (i) unchanged by, and (ii) transparent to, the first-frequency write radiation(s). Neither aspect of this second relationship need hold true for the present invention to function as, for example, a planar optical memory. However, this second relationship is very useful in realizing a 3-D volume optical memory store.

Consider reading. The (un-reacted) dye precursor molecules, and the light-sensitive molecules, are unreactive with, radiation within a particular second range of frequencies—to which second-frequency radiation the dye molecules are strongly reactive. The dye precursor molecules and the light-sensitive-molecules-most particularly do not fluoresce in response to second-frequency radiation within the predetermined frequency range. However, the dye molecules do strongly react (with unitary quantum efficiency) with radiation within this second range of frequencies to fluoresce. Moreover—and as is not functionally required but as might be guessed—the (un-reacted) dye precursor molecules, are—in their lack of reaction with the light-sensitive molecules—transparent to the second-frequency radiation This is a third relationship: only the dye molecules are reactive with the second-frequency radiation, and then only to fluoresce.

(The reading can be by one-photon, or by two-photon, excitation. Clearly if one-photon excitation is used then the single frequency read radiation is within the second range of frequencies. If two-photon excitation is used then both of the read radiation beams, and also their combination, is within the second range of frequencies.)

Accordingly, the present invention concerns more than just a chemical admixture from which the formation of a fluorescent dye from a transparent dye precursor may be indirectly radiatively induced; the present invention also concerns the establishment, and the maintenance, of several very particular relationships between the optical properties of a photochemical and chemical admixture, and its derivatives. Simply "pulling" a few chemicals, and a few photochemicals, "down from the shelf" might permit, as in the prior art, that some chemical reaction might be radiatively directly, or even indirectly, induced. However, such a piece-wise choice of photochemicals and chemicals for their isolated individual properties (or radiation sensitivity, and/or chemical reactivity) is unlikely to establish the desired intricate relationships of the optical properties at all the different frequencies as and between all the photochemical and chemical components The present invention basically involves more that just (i) a photochemical transformation, and (ii) a chemical reaction, in isolation, but instead requires instead a "balancing act" between many interrelated (i) optical/photo sensitivity, and (ii) chemical reactivity, requirements. As stated in this and the preceding section, it is equally as important to establish, and to know, what does not undergo radiatively induced change for any particular frequency radiation as to know what does.

Preferred Chemical Admixtures

In one preferred admixture in accordance with the present invention the: dye precursor molecules consist essentially of rhodamine B base More particularly, the dye precursor molecules may be rhodamine 700 laser dye reacted with potassium hydroxide.

In one preferred admixture in accordance with the present invention the light-sensitive molecules consist essentially of aromatic ortho-nitro-aldehyde compounds. These compounds serve as photo generators of acid. The preferred compounds are drawn from the group consisting of o-nitro-benzaldehyde and 1-nitro-2-naphthaldehyde. Both the o-nitro-benzaldehyde and the 1-nitro-2-naphthaldehyde undergo, upon excitation with ultraviolet light, phototransformation into the same acid: nitroso acid.

If the (i) preferred rhodamine base is combined with the (ii) preferred compound of ortho-nitro-aldehyde then, upon excitation with ultraviolet light, the ortho-nitro-aldehyde undergoes phototransformation into nitroso acid and the rhodamine B base reacts with this nitroso acid to form colored rhodamine B dye. Rhodamine B dye is know as a stable and efficient laser dye.

The photo generators of acid may alternatively consist of vicinal dibromides or other chemical amplifiers. Still other materials are suitable as acid generators and chemical amplifiers. For example, onium salts such as triphenylsulfonium tetrafluroborate and diphenyliodonium tetrafluoroborate are suitable.

Another Embodiment of the Chemical Admixture Particularly Supports a Two-Photon Write (One-Photon Read)-Three-Dimensional Optical Memory (a 2-P 3-D Optical Memory)

Consider the reactions, and the indirect photo-generation, of dye, described in section 3. above. When the appropriate write radiation (the ultraviolet light) is shined upon a matrix containing the chemical admixture, then it will tend to created dye in all selectively illuminated domains. This is fine if the illuminated memory store is planar and one dimensional. However, if the optical memory store is configured as a three-dimensional volume, then localization of the write radiation to only those selected domains desired to be written is troublesome.

The classic solution to this problem is plural-photon, particularly two-photon, absorption—as is described by well known non-linear equations. In a three-dimensional optical memory store written with two intersecting write radiation beams by process of two-photon absorption, only those photochemicals present in domains where the two beams (i) spatially and (ii) temporally intersect will be changed, and all photochemicals not in the intersection regions will remain unchanged.

Clearly no special admixture is required to make the indirect dye creation process of the present invention work with, and by, the non-linear process of two-photon absorption. What can be done with one photon—namely, the phototransformation of an aromatic ortho-nitro-aldehyde compound into nitroso acid—can also be accomplished with two photons having frequencies the combined energies of which sum to be equal to, or larger than, the energy of the single photon (E=hv).

However, the present invention has further aspects, and extensions, in admixtures that are particularly suitable for making of two-photon ("2-P") optical memories. Such 2-P optical memories are commonly (but need not invariably be) three-dimensional, or "3-D". Thus certain chemical admixtures in accordance with the present invention are particularly directed to use in 2-P 3-D. optical memories. Nonetheless to being written by two-photon absorption, and permissively also being read by two-photon absorption, the 2-P 3-D optical memories are commonly read with but a single radiation beam in a single-photon process. If it is imagined that the 3-D memory may be illuminated in a plane slice of its volume, and that the induced, fluorescence should be detected not along the illumination axis, but orthogonally thereto, it may readily be understood why a single radiation beam (i.e., one-photon) suffices for reading an optical memory, and why it is so valuable for the written domains to fluoresce as opposed to simply show color, or opacity.

Returning to the embodiment of an admixture that is particularly suitable to support 2-P processes, particularly in 3-D volume memory stores, in this admixture the photo generation of acid transpires by a chain reaction. In particular, the (preferred) acid is photo-generated by light in a chain reaction of 1,2-dibromoethane in the presence of H-donors; the 1,2-dibromoethane being photo-decomposed in the presence of the H-donors to form the acid HBr.

Alternatively, the acid may be photo generated by a chain reaction of 1,2-dibromoethane in the presence of i-propanol.

Still further, the acid may be photo-generated from onium salts such as triphenylsulfonium tetrafluroborate and diphenyliodonium tetrafluoroborate.

A Method of Using a Chemical Admixture Within an Optical Memory

According to the previous discussion, the present invention may be recognized to be embodied in a photochemical method directing to creating stable molecules having any of light-induced (i) emission(s), (ii) absorption, (iii) coloration and/or (iv) index of refraction that are different from precursor molecules from which the stable molecules are formed.

The method entails placing within a matrix both (i) dye precursor molecules and (ii) light -sensitive molecules. The (i) dye precursor molecules react with (ii) at east one of acids, bases, ions, radicals, and/or molecules (other than the dye precursor molecules themselves) that, have been produced by radiation of light-sensitive molecules, to produce (iii) dye molecules having differing spectroscopic properties than do the dye precursor molecules. The (ii) light-sensitive molecules, when exposed to light, undergo photochemical reaction so as to form at least one of the acids, bases, ions, radicals or excited-state molecules with which the (i) dye precursor molecules are reactive. These photo generated acids, bases, ions, radicals and/or excited-state molecules are permitted to react with the dye precursor molecules to form the dye molecules.

Preferably, and most commonly, the placing within a matrix is of (i) dye precursor molecules that are reactive with acids to produce dye molecules, and of (ii) light-sensitive molecules that are responsive to radiation to photo-generate the acids with which the dye precursor molecules are reactive.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 9 shows Table 1 giving the quantum efficiency for the conversion of NNA to nitroso acid.

FIG. 10 shows Table 2 giving the transient decay rate constants in various solvents.

DESCRIPTION OF THE PREFERRED EMBODIMENT

Figure 1:
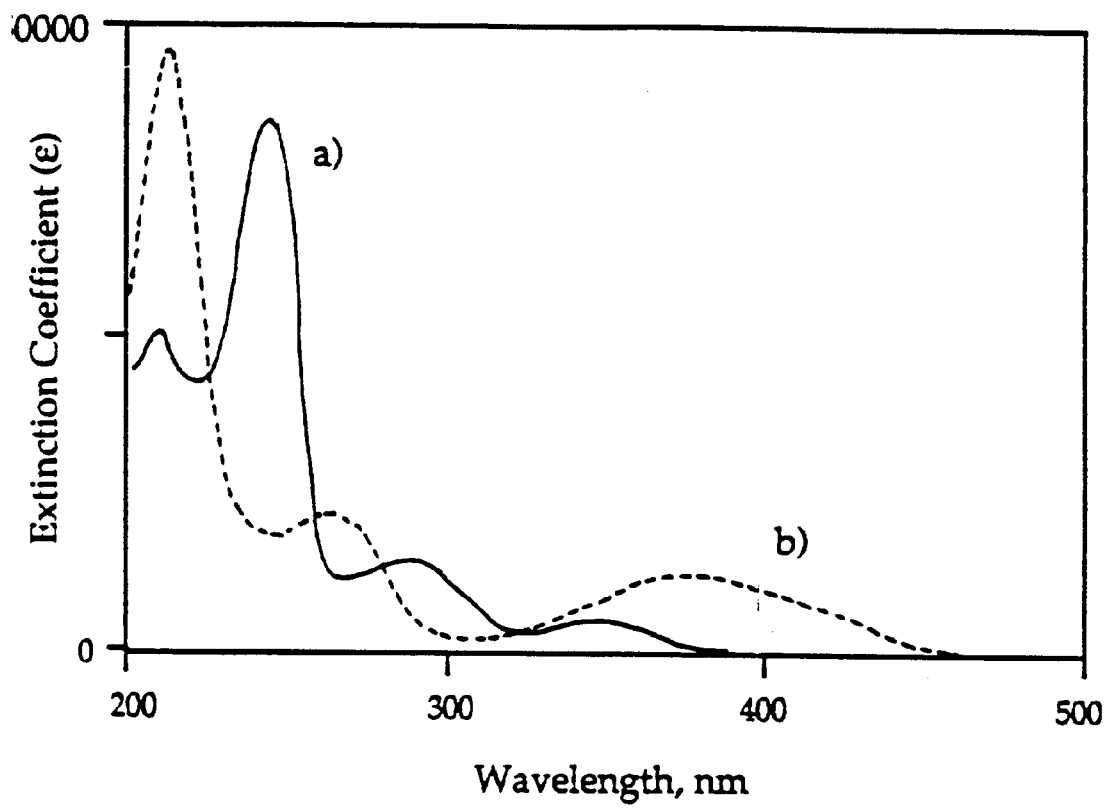
FIG. 1 is a graph showing the absorption spectra of (a) 1-nitro-2-naphthaldehyde (NNA) and (b) nitroso acid in acetonitrile solution.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Synopsis of the Invention and the Preferred New Optical Memory Materials

For the case of organic photochromic memory materials the binary codes, 0 and 1, are formed by the photo-chemical changes which lead to two distinct molecular forms with different structures. The write form of the memory material is usually colorless and absorbs light in the UV region or the spectrum. The absorption of light by this form induces a photochemical reaction, which leads to formation of the written, colored form with the absorption spectrum shifted to the visible region. Accessing of information is based on the (i) detection of fluorescence emitted by the written bits, or (ii) absorption or index of refraction change.

Another means of writing is to use a memory material that is initially fluorescing and to radiatively induce the non-fluorescing state. In such a case the initial, fluorescing, state would commonly be defined as binary "0" while the written, non-fluorescing, state would be defined as a binary "1".

In the present invention a new memory material was designed for ROM (Read Only Memory) or WORM (Write-Once Read-Many) devices, where the information should be written once, stored indefinitely, but may be retrieved an unlimited number of times. The new material is composed of an organic dye which has different structures when dispersed in acidic or basic host media. It is known, that some organic dyes, such as, for example rhodamine, may exist in two forms, depending on acidity and polarity of the matrix or solvent. One of these forms, Rhodamine B base, is colorless and shows complete lack of fluorescence. However, in the presence of acid, this colorless form undergoes transformation into a colored, strongly fluorescing dye, Rhodamine B, which is well known as a stable and efficient laser dye.

Using molecules, which have these and other similar properties, the present invention contemplates new optical storage materials, which are composed of two components: (1) a molecule, which when excited is converted into an acid or a base, radical or ion (referred to as an acid or base, radical or ion generator); and (2) an organic dye precursor, which reacts with the photo-generated acid, base, ion, or excited-state molecule to form a room-temperature stable, strongly-fluorescing dye. The written form of this memory material is the product of a chemical reaction between (i) the photo-generated substance, and (ii) the dye precursor. This written form—the product of the chemical reaction that takes place only after photo activation—is a highly fluorescing dye.

Different generators and dye precursors were used to realize these novel memory materials. As one example, o-nitro-benzaldehyde was used as an acid generator. O-nitro-benzaldehyde undergoes phototransformation into a corresponding nitroso acid upon excitation with UV light. Rhodamine B base was used as a dye precursor. Rhodamine B base was found to react well with the photo induced nitroso-acid to form colored Rhodamine B dye.

After excitation with 355 nm light, the solution develops a strong pink color, and a bright red fluorescence was observed from this form when the solution was illuminated with 532 nm light. An identical color change and fluorescence were observed, after 355 nm irradiation when these same two components were dispersed in solid PMMA matrices. In the case of solid matrices, both the unexposed and colored areas—i.e., the unwritten and written areas—of the polymer film or block did not show any spectral changes or degradation at room, temperature, when they were stored in the dark.

To increase the efficiency of the writing process yet another new memory material—1-nitro-2-naphthaldehyde (NNA)—was utilized as the acid generator component instead of o-nitro-benzaldehyde. It was found that, if excited with UV light, NNA undergoes the same photochemical rearrangement to nitroso-acid as does o-nitro-benzaldehyde. The nitroso-acid, after excitation of NNA with 355 nm light, reacts with Rhodamine B base transforming this colorless dye precursor into a deeply colored fluorescing dye.

Accordingly, the initially colorless solution of the write form, composed of NNA and Rhodamine B base, is transformed to the colored, read form, when irradiated with UV light. The same process was observed when these components were dispersed in a rigid PMMA matrix and excited with light of the same wavelength. This polymer based light sensitive molecular system was successfully used as a ROM memory material.

2. Overall Description of the New Optical Memory Materials

Properties of the preferred chemical admixtures of the present invention may be approached through an understanding the photo rearrangement mechanism of 1-nitro-2-naphthaldehyde and its application to 3D optical storage memory.

The photo rearrangement of 1-nitro-2-naphthaldehyde to the nitroso acid has been studied by the inventors through time-resolved picosecond and nanosecond spectroscopy. Based on the experimental data contained in this specification, it is now postulated that the photo reaction proceeds via both the $^1n\pi^*$ excited singlet state and the low-lying $^3\pi\pi^*$ triplet state. Photo. reactive 1-Nitro-2-naphthaldehyde is recognized to be suitable, along with a dye precursor and more particularly rhodamine dye precursor, as a new optical memory material. This material has been successfully demonstrated in two-photon three-dimensional (2-P 3-D.) optical storage devices.

2.1 Photo rearrangement of 1-nitro -2-naphthaldehyde to Nitroso Acid

The photo isomerization of aromatic nitro compounds to nitroso compounds was reported initially by Ciamician and Silber. See Ciamician, G. ; Silber, P. *Ber. Deutsch. Chem. Ges.*, 34 (1901) 2040. Ciamician and Silber observed that o-nitrobenzaldehyde was converted to o-nitrosobenzoic acid when exposed to sunlight. This process, was found to take place both in solution and in the crystalline state.

Since that time a number of other ortho-substituted nitroaromatic compounds, which undergo similar photo rearrangement, have been studied. See Schonberg, A. *Preparative Organic Photochemistry*, Springer-Verlag New York, Inc.: New York, 1968; pp 267–270. In addition the o-nitrobenzaldehyde photo reaction has been used as an actinometer to measure solar UV radiation. See Morales, R. G. E.; Jara, G. P.; Cabrera, S. *Limnol. Oceanogr.*, 38(3) (1993) 703.

Because of its importance as both a model for photo rearrangement and practical use, the mechanism of o-nitrobenzaldehyde phototransformation has been studied by several investigators in detail. See George, M. V.; Scaiano, J. C. *J. Phys. Chem.*, 84 (1980) 492; Yip, R. W.; Sharma, D. K. *Res. Chem. Intermed.*, 11 (1989) 109; Kuberski, S.; Gebicki, J. *J. Molec. Structure*,. 275 (1992) 105; Mayo, P.; Reid, S. T. *Quart. Rev.*, 15 (1961) 393; Yip, R. W.; Sharma, D. K.; Giasson, R.; Gravel, D. *J. Phys. Chem.*, 89 (1985) 5328; and Schupp, H.; Wong, W. K.; Schnabel, W. *J. Photochem.*, 36 (1987) 85.

It has been shown that the photo rearrangement of o-nitrobenzaldehyde proceeds via formation of a ketene intermediate. See George, et. al., op cit.; Mayo, et al. op cit.; Yip,. et al., op cit.; and Schupp, et al., op cit. Decay into nitroso acid is accelerated by the presence of water. The ketene intermediate generated by UV excitation of matrix-isolated o-nitrobenzaldehyde was stabilized at low temperature (10° K) and characterized by means of UV-VIS. and IR spectroscopy. See Kuberski, et. al., op cit.

The primary steps of the photo rearrangement of o-nitrobenzaldehyde into nitroso acid have been studied by means of time-resolved spectroscopy where some controversial data on the nature, of Photo reactive excited electronic states were presented. See. George, et al., op cit.; and Yip, et al. (1989), op cit. To the best knowledge of the inventors no direct experimental observations involving triplet or singlet excited states in the photochemical transformation of o-nitrobenzaldehyde have been reported.

A study of the reaction mechanism of 1-nitro-2-naphthaldehyde (NNA), which undergoes an analogous photo rearrangement to nitroso acid, was undertaken. The following data, obtained by means of time-resolved picosecond and nanosecond spectroscopy and several analytic measurements, provides a rather complete understanding of the intermediates, final product, kinetics and mechanism of this photo reaction. From this understanding confidence in the radiative performance of an optical memory constructed from the chemicals, and in respect of the photo rearrangement reaction, may be had.

Based on photo reaction mechanism of NNA, a novel photochromic material has been developed that has been spectroscopically qualified as useful for two-photon optical memories. This material has been-successfully utilized by the inventors for storing huge amounts of information inside a 3D volume and accessing the stored information in parallel, at a nanosecond transfer rate, by means of two photon absorption. See Dvornikov, A. S.; Rentzepis, P. M. *Optics Communications*, 136 (1997) 1.

2.2 Experimental Data

1-Nitro-2-naphthaldehyde (NNA) was synthesized according to the method described in Makosza, M.; Owczarczyk, Z. *J. Org. Chem.*, 54 (1989) 5094. All starting chemicals were HPLC purity and purchased from Aldrich.

The polymer materials were prepared by radical polymerization of methyl methacrylate solutions containing $10^{-1}$ M. NNA, $10^{-4}$ M Rhodamine B base and $2\times10^{-2}$ M 2,2'-azobis (2-methyl-propionitrile) initiator. The polymerization process was carried out at 50° C. for ~70 honors. The polymer blocks were cut to 1cm³ cubes and polished to $\lambda/5$.

The ground state absorption spectra were collected by a double beam Shimadzu UV160U spectrophotometer, and the IR spectra were recorded by means of a Nicolet 205 FT-IR Spectrometer. Nuclear magnetic resonance (nmR) spectra were recorded by means of a QE300 nmR Spectrometer and mass spectra were recorded by means of VG Analytical 7070E Mass Spectrometer.

The picosecond transient absorption spectra and kinetics were measured by the laser system described by the inventors previously. See Dvornikov, A. S.; Rentzepis, P. M., *Res.*

*Chem. Intermed.*, 22 (1996) 115. A single 35 ps, 355 nm third harmonic pulse, from a Quantel Nd:YAG laser, was used for the excitation of NNA solutions.

The picosecond continuum used to detect the transient absorption spectra was generated by focusing the 532 nm or 1064 nm pulses into a cell containing the $D_2O/H_2O$ mixture. The continuum pulse, after it passed through the volume of the sample cell, was analyzed by an OMA system. Changing the delay time between excitation and probe pulses permitted recording a complete histogram of the spectra of the transient species induced by the excitation pulse.

The nanosecond kinetics and spectra of the transients were measured by an experimental system utilizing a Continuum Surlite II Nd:YAG laser emitting 6 ns pulses at 1064 nm. The third harmonic, 355 nm, 3 mJ pulse was used for excitation of the sample solutions. The probe beam, either a msec photoflash or a halogen projector lamp, was focused in the sample cell and then imaged, by a system of lenses, on the monochromator. The output slit of the monochromator was connected to a PMT (Hamamatsu R928) coupled to a digital Tektronix TDS 410A oscilloscope and computer. The same experimental system was used for both phosphorescence lifetime and transient spectra measurements in the nanosecond and longer time ranges.

The 150 W Xe Arc Lamp (Oriel Research Arc Lamp Source) was used for continuous photochemical irradiation of the samples, using optical filters to select the appropriate wavelength.

Low temperature experiments were conducted in a four side quartz optical cell placed in a liquid nitrogen quartz Dewar with, optical windows. The low temperature solvents used were 3-methylpentane, methylcyclohexane and EPA.

The solutions were de-aerated by several freeze-pump-thaw cycles and sealed under vacuum.

The method and experimental system for writing and reading information in 3D by means of two-photon absorption has been previously described in Dvornikov, eta al. (1997–1), op, cit,; and in Dvornikov, A. S., Cokgor, I., Wang, M., McCormick, F. B., Esener, S. E. and Rentzepis, P. M. *IEEE CPMT* -Part A, 20 (1997) 203.A.S. [10,13]. Therefore this method and system will be presented, only briefly, in a later section.

2.3 Results Part 1: Spectroscopic Properties and Photo reaction Quantum Yield

Figure 2:
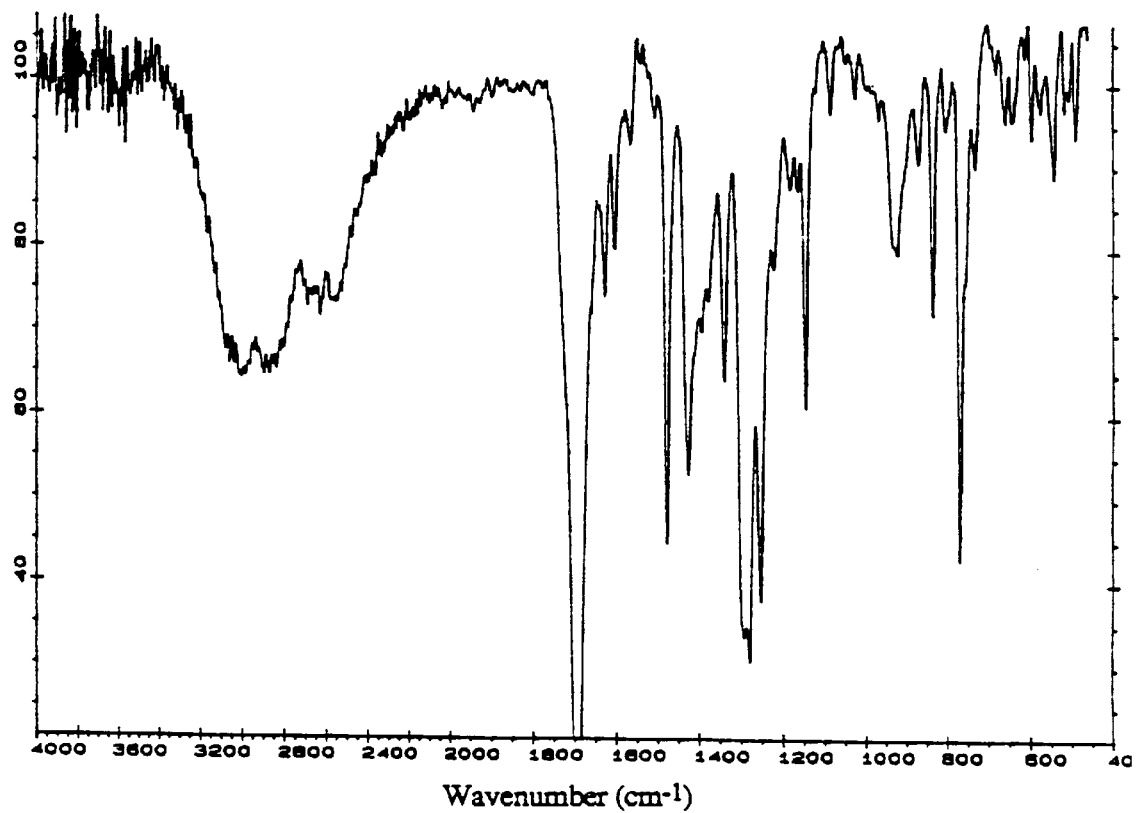
FIG. 2 is a graph showing the spectrum of photoproduct of NNA.

The absorption spectrum of NNA is shown in FIG. 1. Excitation of NNA with UV light induced the formation of the yellow nitroso acid which has its absorption maximum at 395 nm, see FIG. 1. To verify that the final product of the photochemical reaction of NNA is the nitroso acid, as is the case for o-nitrobenzaldehyde, the IR, nmR and mass spectra of this product were measured. A de-aerated concentrated solution of NNA in cyclohexane was irradiated with UV light (150 W Xe Lamp, $\lambda$=300–400 nm) and the precipitated product of this photo reaction was is then collected, washed with solvent and dried. The IR spectrum of the product, FIG. 2, was found to exhibit the characteristic absorption bands of carboxylic acids. The broad band at, 2800 cm$^{-1}$ is due to the O—H group, the sharp bands at 1700 cm$^{-1}$ and at 1250 cm$^{-1}$ are characteristic of the C=O and C—OH groups respectively. The $^1$H—and $^{13}$C—nmR spectra of the product exhibit characteristic peaks at $\delta$ 13.7 and at $\delta$ 167 respectively due to the presence of COOH in the molecule. Similar peaks are observed for nitroso-acid, produced by photolysys of o-nitro-benzaldehyde. The mass spectrum shows the mass of the product is equal to 201.0426, which is exact mass of 1-nitroso-2-naphthalene carboxylic acid ($C_{11}H_7NO_3$). These data confirm, that the photo reaction of NNA is a strictly intra molecular process of atom exchange between different molecular groups.

It was found that photo rearrangement of NNA to the nitroso acid is an irreversible process and no back photo reaction when nitroso acid is excited in its long wavelength absorption band with light $\lambda$>400 nm was detected. Prolonged irradiation of the nitroso acid, however, leads to photo decomposition of the molecules.

Because the nitroso acid is a relatively light stable compound, it was possible to measure its extinction coefficient rather accurately. The 10$^{-4}$ M NNA solution in acetonitrile was irradiated with UV light (150 W Xe Lamp, $\lambda$=300–400 nm) until no changes in the absorption spectra were observed. This implies that all of the NNA is completely transformed into nitroso acid and that the concentration of the photo induced nitroso acid is equal to the initial concentration of NNA. The extinction coefficient of the nitroso acid was calculated from the ratio of the absorbencies of nitroso acid and its precursor NNA, see FIG. 1.

The quantum yield of the phototransformation of NNA into nitroso acid, which is the ratio of the number of nitroso acid molecules formed during the light excitation process to the number of photons absorbed by NNA, was also measured. A 10$^{-3}$ M de-aerated solutions of NNA in different solvents (see Tab. 1) placed in a 1 cm quartz optical cell were irradiated with 355 nm light, emitted by the third harmonics of the Surelite II Nd:YAG laser. The excitation light energy was maintained at ~7 mJ/cm$^{-2}$. At this energy level the dependence of the accumulation rate of nitroso acid vs energy was found to be linear, this eliminates the possibility of non-linear photo processes. The optical density of the solution at this wavelength is about 2, therefore, practically all the light is absorbed by the solution. The light intensity was measured by means of Aberchrome 540 chemical actinometer and also calculated using the, energy, measured by the Molectron JD2000 Joulemeter. See Heller, H. G.; Langan, J. R. *J. C. S. Perkin. II*, (1981) 341. Both measurements showed the same result. The number of nitroso-acid molecules was calculated from its absorption spectrum and extinction coefficient, measured for specific solvent. The measurements were conducted under conditions where the accumulation of nitroso acid had a linear dependence on excitation time. The quantum yields are summarized in Table 1. The quantum yield is approximately 0.5 and does not depend on solvent polarity, however at 77° K., the photochemical reaction of NNA was found to occur with much lower quantum yield (~0.04).

2.4 Results Part 2: Transient Absorption Spectra and Kinetics

Figure 3:
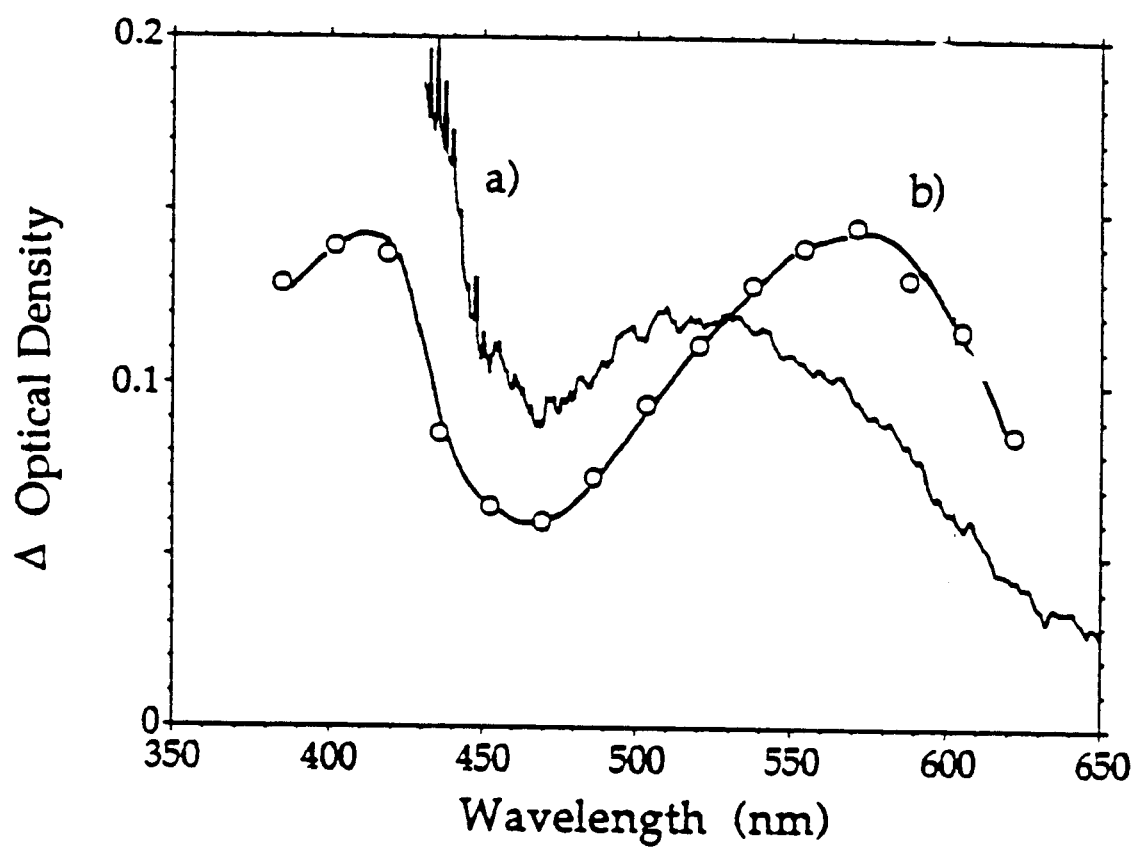
FIG. 3 is a graph showing the transient absorption spectra of de-aerated NNA solutions ($4 \times 10^{-4}$ M): (a) in cyclohexane, 500 ps after excitation with a 355 nm, 30 ps laser light pulse; and (b) in acetonitrile after excitation with a 3.55 nm, 6ns laser light pulse.
Figure 4A:
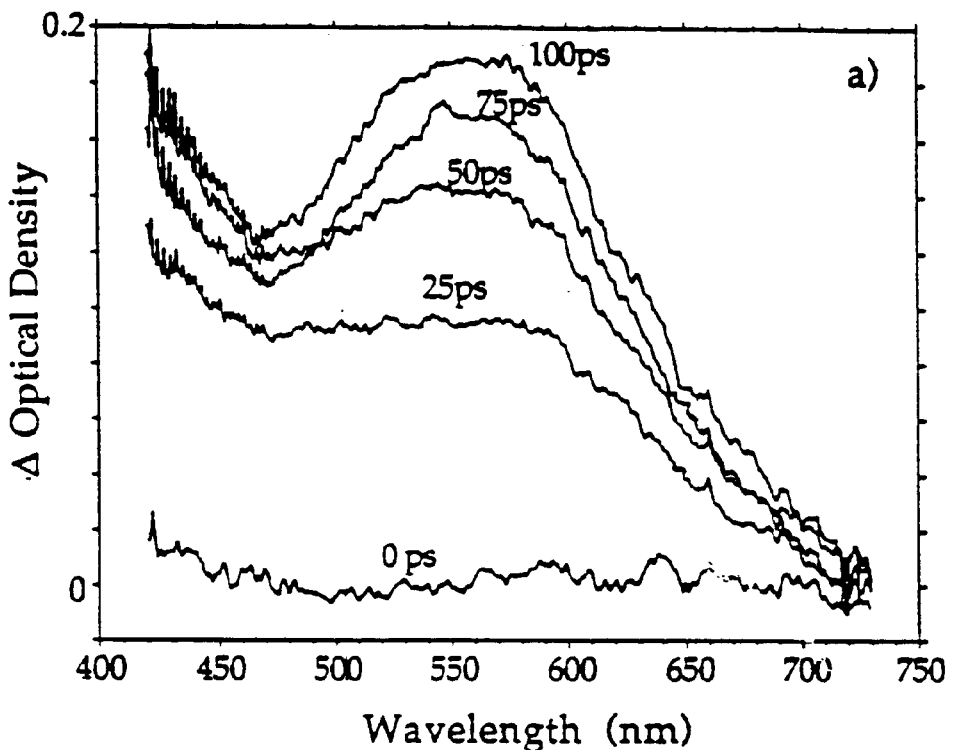
FIG. 4a is a graph showing the transient absorption spectra change after excitation of de-aerated NNA solution in: 1,2-dichloroethane ($4 \times 10^{-4}$ M).
Figure 4B:
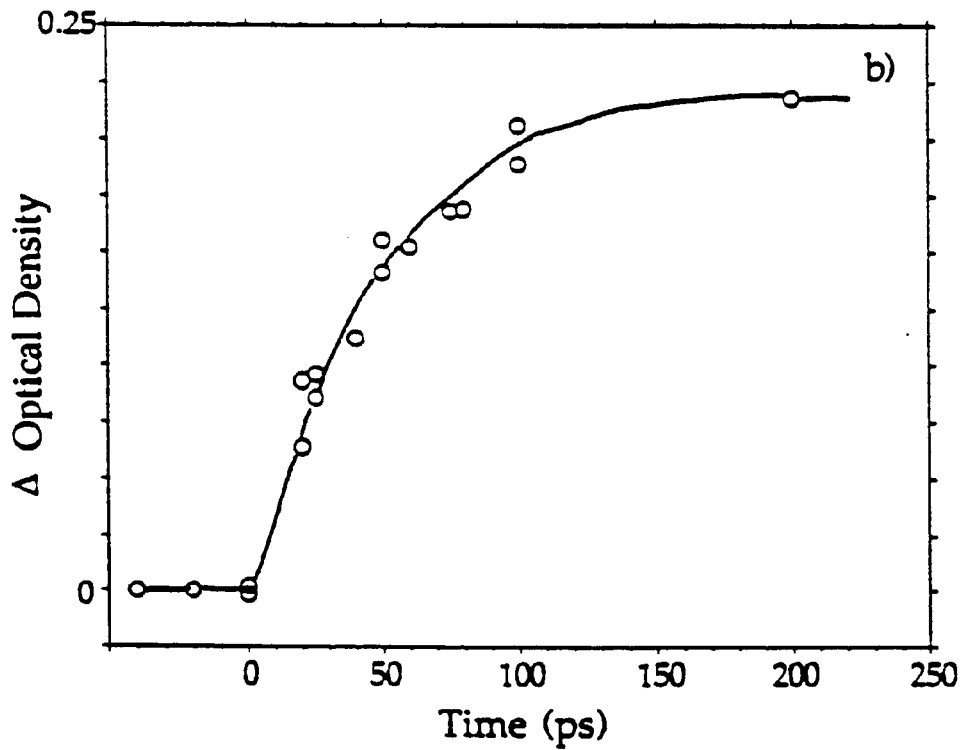
FIG. 4b is a graph showing and accumulation kinetics of the transient of FIG. 4a after excitation of de-aerated NNA solution in 1,2-dichloroethane ($4 \times 10^{-4}$ M).

When a solution of NNA was irradiated with a 355 nm wavelength picosecond duration laser pulse, the formation of a transient species with the absorption spectrum shown in FIG. 3 was observed. The rate of formation of this, the only intermediate observed in the kinetics experiments, was practically as fast as the excitation pulse duration, $\tau_{pulse}$~40 ps. FIG. 4 shows a plot of the optical density change, of the long wavelength absorption maximum of the transient, vs. time. The accumulation rate constant value was measured to be 2×10$^{-10}$ S$^{-1}$. FIG. 4a a shows the evolution of the triplet state spectrum resulting from the intersystem crossing. At shorter lifetime, i.e. 25 ps, the spectra are composed of both $S_1 \rightarrow S_n$ and $T_1 \rightarrow T_n$, while at later times, i.e. 75 ps, practically the whole spectrum is due to the triplet state alone.

The decay of the transient followed first-order kinetics and the observed lifetime of the transient was found to increase with increasing solvent polarity. See Table 2. in FIG. 10. Also, the absorption spectra of the transient species experienced a red shift in the long wavelength band, with solvent polarity, as shown in FIG. 3. This indicates that the transient has a considerable dipole.

Unlike o-nitrobenzaldehyde [see George, et. al. (1080), op. cit.], where the decay of the transient is strongly accelerated by the presence of water, no significant change in the transient kinetics when a small amount of water was added to solutions of NNA was observed. Instead, when a water/acetonitrile mixture was used as the solvent, the transient was found to be more stable. See Table 2 in FIG. 10.

In oxygen saturated solutions the decay rate of the transient is faster than in de-aerated solutions, as shown in FIG. 5.

Figure 5A:
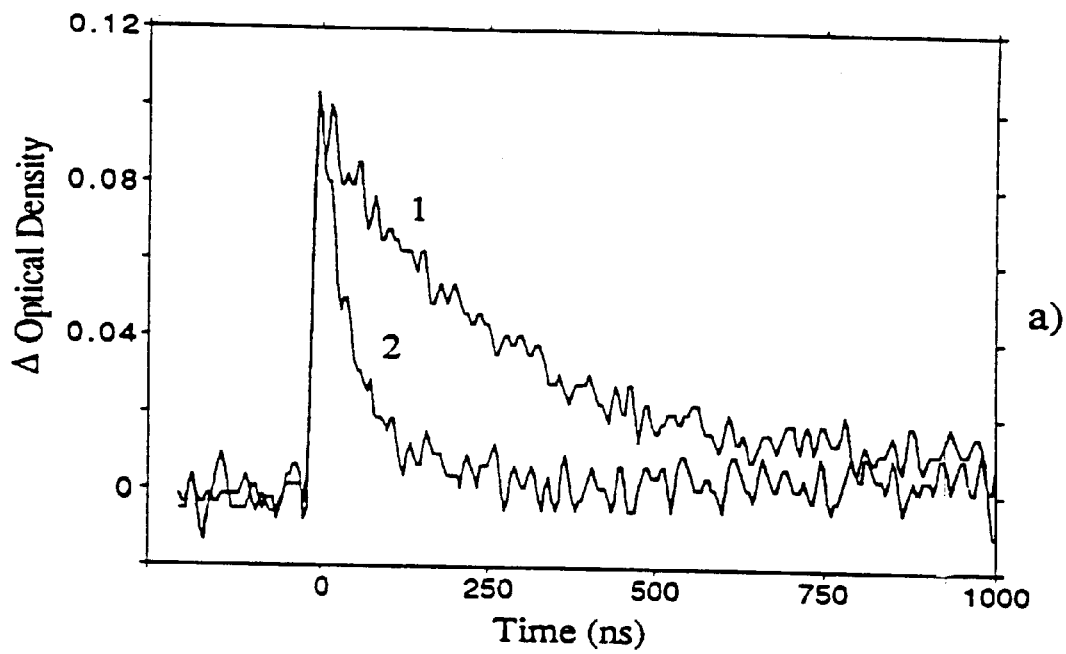
FIG. 5a is a graph showing the effect of oxygen on transient kinetics in acetonitrile (conc. NNA $4 \times 10^{-4}$ M) measured at $\lambda$=570 nm in de-aerated (1) and oxygen saturated (2) solutions.

Oxygen is more effective in polar solvents, where the lifetime of the transient is longer. In non-polar solvents, such as benzene, where the lifetime of the transient is about 50 ns, oxygen has practically no effect on the transient kinetics. This is expected because the reaction with oxygen is diffusion controlled. It should be noted that oxygen affects only the lifetime of the transient, while the intensity of the transient absorption remains the same in the presence and absence of oxygen. This is depicted in FIG. 5a, where the rate of decay with $O_2$ is shown to be faster than without $O_2$. The quantum yield of the nitroso acid formation, measured by the transient absorption kinetics at 400 nm, where the nitroso acid has a strong absorption band, was found to decrease in the presence of oxygen, FIG. 5b. At 1 ms after excitation when the fast transient has practically no measurable absorption, only the non decaying absorption of the stable nitroso acid is observed. The decrease in optical density in the presence of oxygen corresponds therefore to a decrease in the photo reaction quantum yield.

2.5 Low Temperature Experiments

Figure 6A:
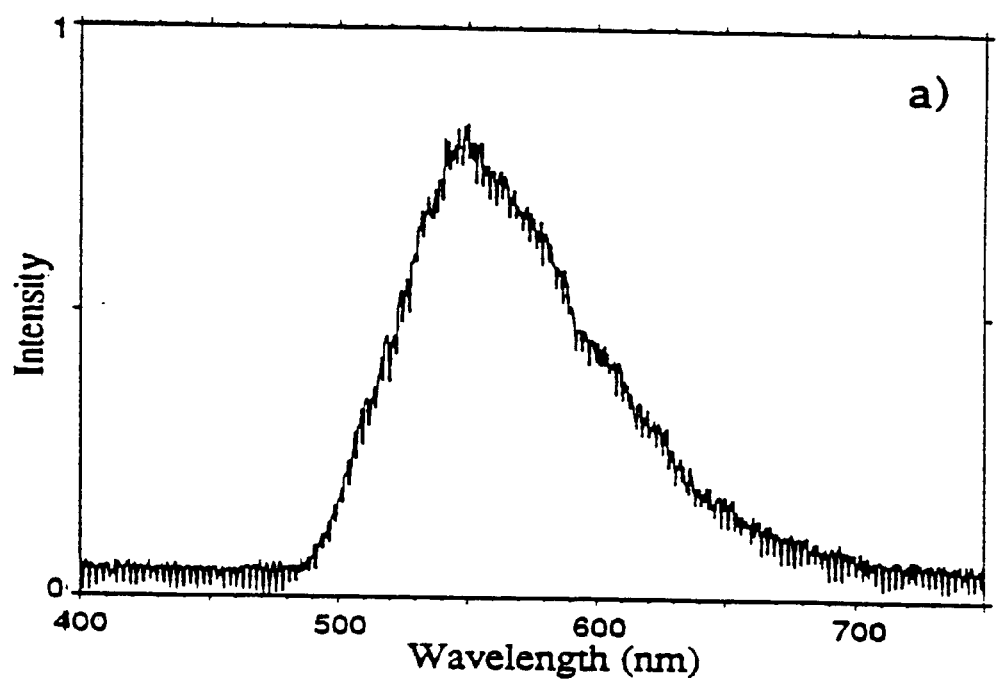
FIG. 6a is a graph showing the phosphorescence spectrum of NNA ($4 \times 10^{-4}$ M) in de-aerated EPA matrix at 77° K.
Figure 6B:
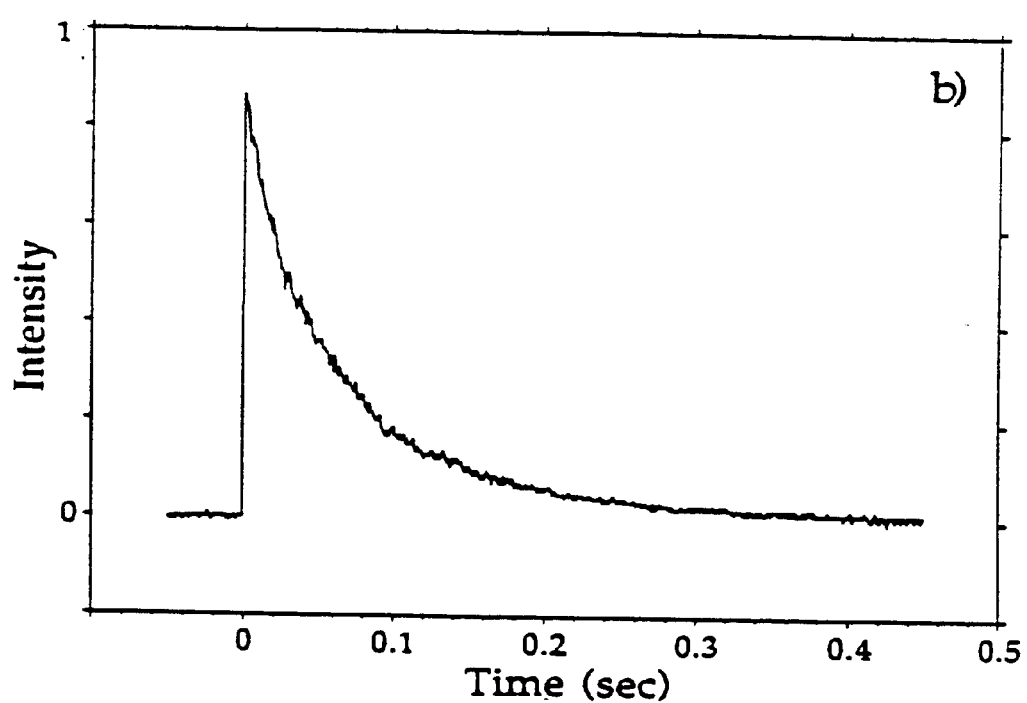
FIG. 6b is a graph showing the phosphorescence decay kinetics of NNA ($4 \times 10^{-4}$ M) in de-aerated EPA matrix at 77° K.

Low temperature (77° K.) excitation of NNA dispersed in EPA and i-PrOH matrices induced high intensity phosphorescence which has the spectrum shown in FIG. 6a. The decay of the phosphorescence in EPA matrix is shown in FIG. 6b, where the posphosphurescence intensity is plotted vs. time. The lifetime of the observed phosphorescence was estimated to be about 70 ms.

Figure 7A:
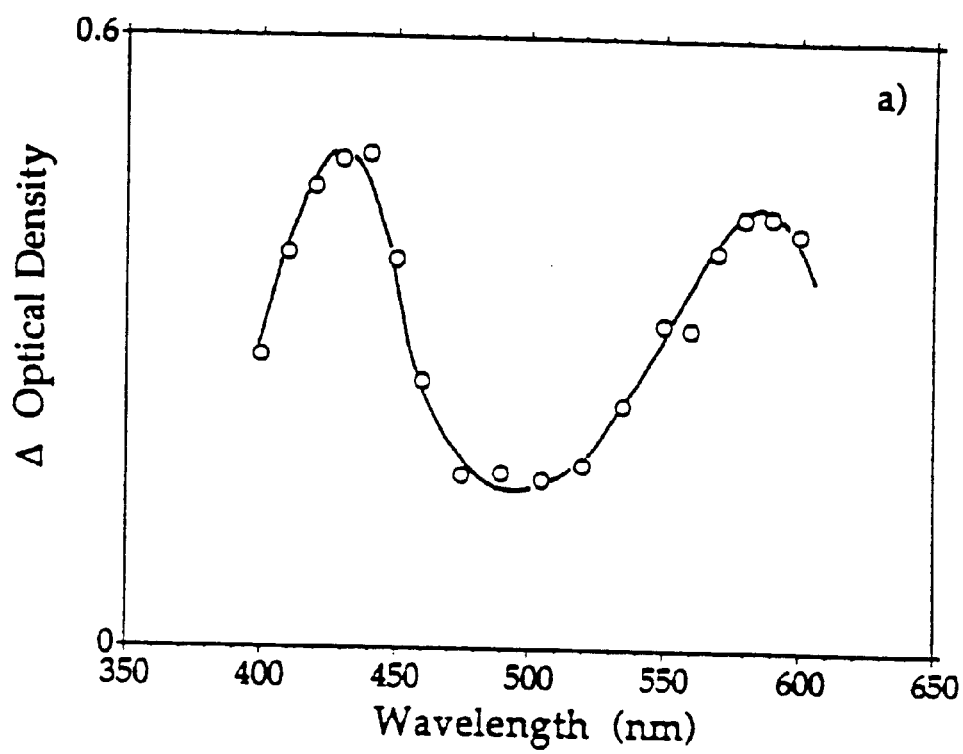
FIG. 7a is a graph showing the transient absorption spectrum of NNA in EPA matrix at 77° K.

The transient absorption spectra and kinetics after excitation of NNA with a 355 nm laser pulse in glassy EPA and i-PrOH matrices was measured at 77° K. The absorption spectrum of the transient, shown in FIG. 7a, is very similar to the one measured in liquid solutions at room temperature. The decay of this transient followed first-order kinetics with a lifetime of 65 ms, which is also the lifetime of the phosphorescence of NNA in EPA matrix at 77° K.

2.6 Discussion of the Experimental Data

The experimental data suggests that NNA, like its close analog o-nitrobenzaldehyde, under light excitation undergoes photochemical rearrangement to the corresponding nitroso acid: The quantum yield of this transformation was found to be rather insensitive to the nature of the solvent and excitation light wavelength (See Table 1 in FIG. 9), as has been observed for the photo reaction of o-nitrobenzaldehyde. See George, et al. (1980), op, cit. The lack of dependence of the reaction quantum yield on excitation light wavelength indicates that the photo reaction proceeds via the lowest electronic excited state. The reaction mechanism of o-nitrobenzaldehyde has been studied by several research groups [e.g. George, et al. (1980), op, cit.; and Yip, et al. 91989)., op. cit.] but no direct observations, which can prove the nature of the photoactive electronic excited state, were presented. Because the photo reaction quantum yield was decreased [see George et. al. (1980), op. cit.] by the addition of the triplet-state quencher, trans-1,3-pentadiene, it was suggested that the photo reaction of o-nitrobenzaldehyde proceeds via a short-lived triplet excited state. Nevertheless, the authors of Yip, et. al. (1989) (op. cit.), who studied the photo reaction of o-nitrobenzaldehyde by means of time-resolved spectroscopy, found no evidence of triplet excited states involved in the photochemical reaction, and instead suggested that the photo reaction proceeds via the photoactive singlet excited state. Flash-photolysis studies of o-nitrobenzaldehyde detected the only intermediate that has been observed during its phototransformation into nitroso acid. This intermediate, assigned to a ketene structure, was found to be extremely sensitive to the presence of water due to catalysis of its transformation into nitroso acid. See George, et al. (1980), op cit.; and Yip, et al. (1989), op cit.

The ketene intermediate in the photochemical reaction of o-nitrobenzaldehyde was also detected in matrix-isolation studies, at 10 K, by means of UV-VIS and IR spectroscopy. See Kuberski, S.;

Gebicki, J. *J. Molec. Structure*, 275 (1992) 105.

As in the case of o-nitrobenzaldehyde, one intermediate was observed during photolysis of NNA. Its absorption spectra are shown in FIG. 3. Unlike o-nitrobenzaldehyde, the lifetime of the intermediate formed during photolysis of NNA was not affected by the presence of water but increased with increasing solvent polarity, as shown in Table 2 of FIG. 10. These differences in the behavior of the intermediate observed, leads the inventors to suggest, that in the case of NNA the reactive intermediate is a triplet excited state rather than the ketene intermediate, which was observed in the photolysis of o-nitrobenzaldehyde.

As it can be expected for nitro- and formyl-substituted naphthalenes, excitation of NNA at 355 nm results in the population of the $^1n\pi^*$ state, ($\epsilon \approx 2200$). See Calvert, J. G.; Pitts, J. N. *Photochemistry*, Wiley, N.Y., 1966, p. 369; Turro, N. J. *Molecular photochemistry*, W. A. Benjamin, N.Y., 1967 p. 15; Jaffe, H. H.; Orchin M. *Theory and applications of ultraviolet spectroscopy*, Wiley, N.Y., 1962, p. 213; Itih, I. *Spectrochimica Acta Part A*, 52 (1996) 343; Yagi, M.; Shioya, Y.; Higuchi, J. *J. Photochem. Photobiol.* A:, 62 (1991) 65; and Martins, L.; Fernandes, M.; Kemp, T.; Formosinho, S.; Branco, J. *J. Chem. Soc.* Faradey Trans., 87 (1991) 3617.

The absorption maximum of this band was found to have a red shift from 345 nm in polar acetonitrile to 348 nm in non-polar cyclohexane solutions, suggesting $^1n\pi^*$ character for this state. There are also two $\pi\pi^*$ states in the UV area of 230 nm to 300 nm with $\epsilon_{245}$=42,100 and $\epsilon_{287}$=7,400. The excited $n\pi^*$ state relaxes with a lifetime of 50 ps (FIG. 4) to a lower lying excited state which is assigned to a triplet state, $^3\pi\pi^*$ based on the data presented above. The intersystem crossing rate of $2\times10^{10}$ s$^{-1}$ is commensurate with an $^1n\pi^*$ initial level decaying into a $^3\pi\pi^*$ triplet state. This fast rate is responsible for a highly populated triplet state and consequently for the strong $T_1 \to T_n$ absorption observed with a maximum at ~580 nm.

The location of the charge transfer bands play a dominant role in the ISC rate. In the case of NNA the CT band is expected to be in the higher energy region, as is in 1-nitronaphthalene (e.g. 8.5 eV [21]), but contribute to the $^3\pi\pi^*$ character. This CT contribution again favors a fast $^1n\pi^* \to ^3\pi\pi^*$ rate. The measured 50 ps triplet formation time constant is slower than the 13 ps time constant observed for 1-nitronaphthalene because of the larger separation of the states involved in NNA. A further support to the $^3\pi\pi^*$ assignment of the transient is the red shift which was observed of its long wavelength absorption band with increasing solvent polarity.

From the phosphorescence spectrum, FIG. 6a, the location of the transient 0–0 band absorption was found to be 510 nm (19,600 cm$^{-1}$) where the 1-nitronaphthalene CT, $^3\pi\pi^*$ band is also located. See Ohtani, H; Kobayashi, T; Suzuki, K; Nagakura, *S. Bull. Chem. Soc. Jpn.*, 53 (1980) 43. This provides further support for the $^3\pi\pi^*$ assignment of the transient. Assignment to a $^3n\pi^*$ is not favored because of the large ST separation of ~18,000 cm$^{-1}$ (50 Kcal) and the red shift observed with solvent polarity.

Stabilization of this triplet state by polar solvents suggests a considerable increase in the dipole moment of the triplet state. In polar solvents, such as acetonitrile and alcohols, where the lifetime of the observed triplet state is about 200–300 ns (see Table 2 in FIG. 10) it was found that oxygen accelerates its decay rate, while the intensity of the signal due to-triplet-triplet absorption at zero-time (right after the excitation with a 6 ns laser pulse) remains the same. See FIG. 5. The decay rate constant of the triplet state in the presence of a triplet quencher, such as oxygen, may be represented as: $k=k_o+k_q[O_2]$, where $k_o$ is the rate constant in the absence of oxygen; $k_q$ is the quenching constant and $[O_2]$ is the concentration of oxygen. In de-aerated and oxygen saturated acetonitrile solutions the decay rate constants were measured and found to be equal to $3.1\times10^6$ and $2\times10^7$ M$^{-1}$ s$^{-1}$ respectively. The concentration of oxygen in oxygen saturated solution is about $9.5\times10-3$ m$^{15}$. From these data the triplet quenching constant was estimated to be $k_q\sim1.8\times10^9$ M$^{-1}$ s$^{-1}$. This value corresponds to the triplet quenching by oxygen. See Murov, S. L. *Handbook of Photochemistry*, Marcel Dekker, Inc.: New York, 1973; p. 59, 89.

Figure 7B:
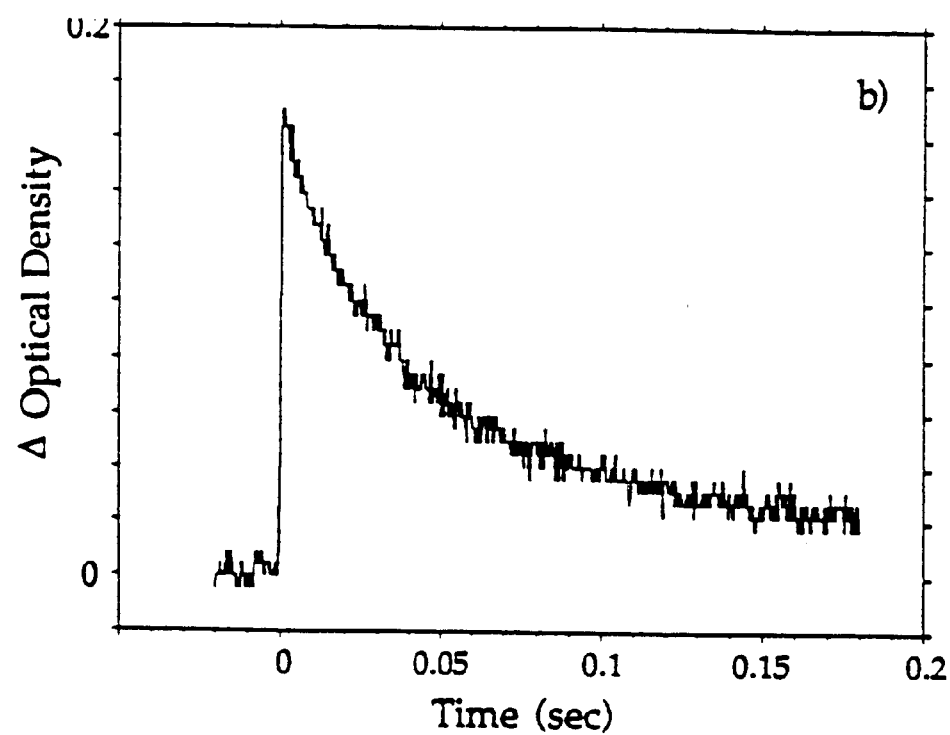
FIG. 7b is a graph showing the transient absorption kinetics of NNA in EPA matrix at 77° K.

To further establish that the observed intermediate is the excited triplet state of NNA, experiments were conducted at 77° K., in EPA and i-PrOH matrices. The bright phosphorescence of the excited NNA molecules, dispersed in solid matrices at 77° K,. was observed in the region of 520–580 nm, and is shown in FIG. 6a. The triplet-triplet absorption spectrum, measured at 77° K. (See FIG. 7a), is found to be the same as the spectrum measured at room temperature. This fact suggests that the same intermediate is observed at both temperatures. The decay rate of the triplet state at 77° K, measured by the decrease of the triplet-triplet absorption intensity as a function of time, also corresponds to the phosphorescence decay rate, see FIG. 6b and 7b. The quantum, efficiency of the photochemical reaction at 77° K. decreases by an be order of magnitude compared to the one measured at room temperature. These data are listed in Table 1 of FIG. 9. It should be noted that in non-polar matrices at 77° K., such as 3-methylpentane and methylcyclohexane, only weak phosphorescence was observed and the quantum efficiency of the photo process was found to be higher than in polar matrices. These data are also presented in Table 1 of FIG. 9.

Figure 5B:
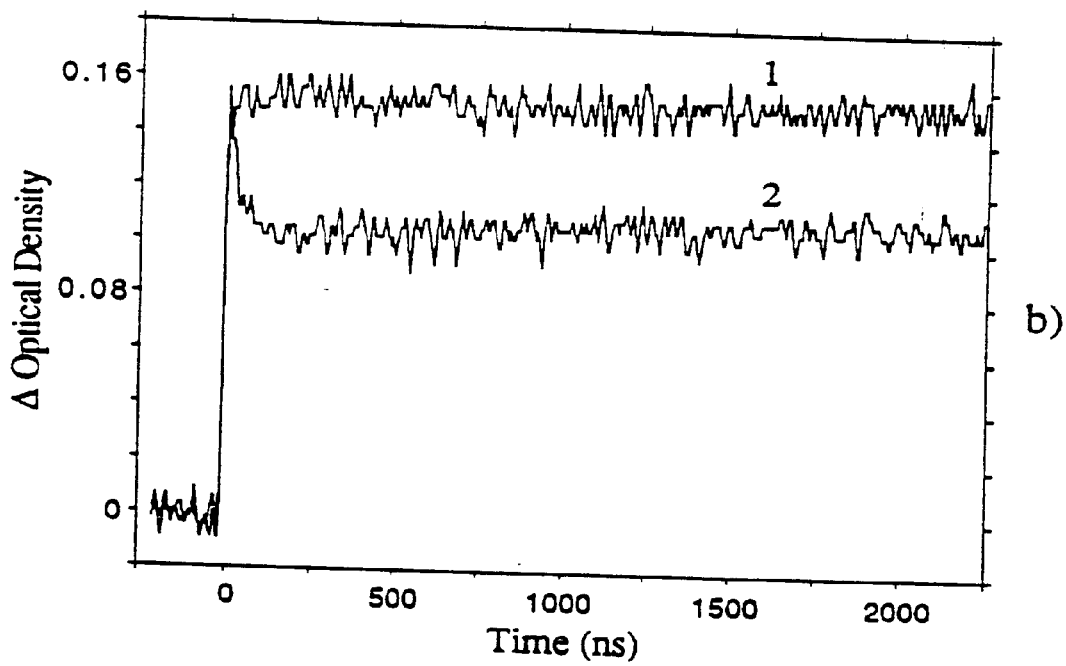
FIG. 5b is a graph showing the effect of oxygen on transient kinetics in acetonitrile (conc. NNA $4 \times 10^{-4}$ M) measured at $\lambda$=400 nm in de-aerated (1) and oxygen saturated (2) solutions.

The quenching of the photochemically active triplet state by oxygen leads to a decrease in the photo reaction quantum yield, observed in polar solvents, see FIG. 5. In non-polar solvents, where the decay time of the triplet state is shorter than 50 ns, the effect of oxygen was not observed, because at that rate the concentration of oxygen was not enough to quench the triplet state. FIG. 5b shows that in oxygen saturated acetonitrile solutions the photo reaction quantum yield was found to be 1.4 times less than the quantum yield in de-aerated solutions. The lifetime of the triplet excited state was found to decrease by a factor of 4.6 under the same conditions, these data are shown in FIG. 5a. When the product of the photo reaction is formed exclusively via the triplet excited state, then the quenching of this photoactive electronic excited state should also result in the decrease of the photo reaction quantum yield. The difference in the decrease of nitroso acid quantum yield and triplet excited state lifetime found in our experiments suggests that part of the product is formed via the singlet excited state. The total quantum yield of the photo reaction was measured to be 0.5, see Table 1. This suggest that an internal conversion deactivation process of the singlet excited state competes effectively with singlet to triplet intersystem crossing and the photo reaction. This is substantiated by the fact that no fluorescence was detected in NNA solutions. The formation rate constant of the triplet excited state which corresponds to the decay constant of the singlet excited state, was measured to be $2\times10^{10}$ sec$^{-1}$ (See. FIG. 4). These results prompt the inventors to propose the following reaction scheme, quantum efficiencies and rate constants for the processes involved in the phototransformation of NNA:

The ketene intermediate was not observed during photolysis of NNA, but the involvement of this product is suggested by analogy with the photo reaction of o-nitrobenzaldehyde, where the ketene transient was detected. The inventor's failure to observe the ketene intermediate in the case of NNA may be due to its relatively low absorption intensity compared to the observed triplet-triplet absorption. The absorption spectra of the ketene and the triplet state are expected to overlap and consequently the ketene absorption spectrum may be masked.

3. Use of the Preferred Chemicals as 2-P 3-D Optical Memory Materials

The two forms of the molecule represent the 0 and 1 of the computer binary code. The original form, non irradiated form, corresponds to the zero of the binary code. When this molecule is excited it undergoes a photochemical transformation to a colored form corresponding to the binary code 1. The forms corresponding to 0 and 1 in the binary code may be either (i) reversible, whereupon they form a write/read/erase memory or (ii) so that the back reaction is not possible, resulting in a write once read many, or WORM, memory.

Figure 8A:
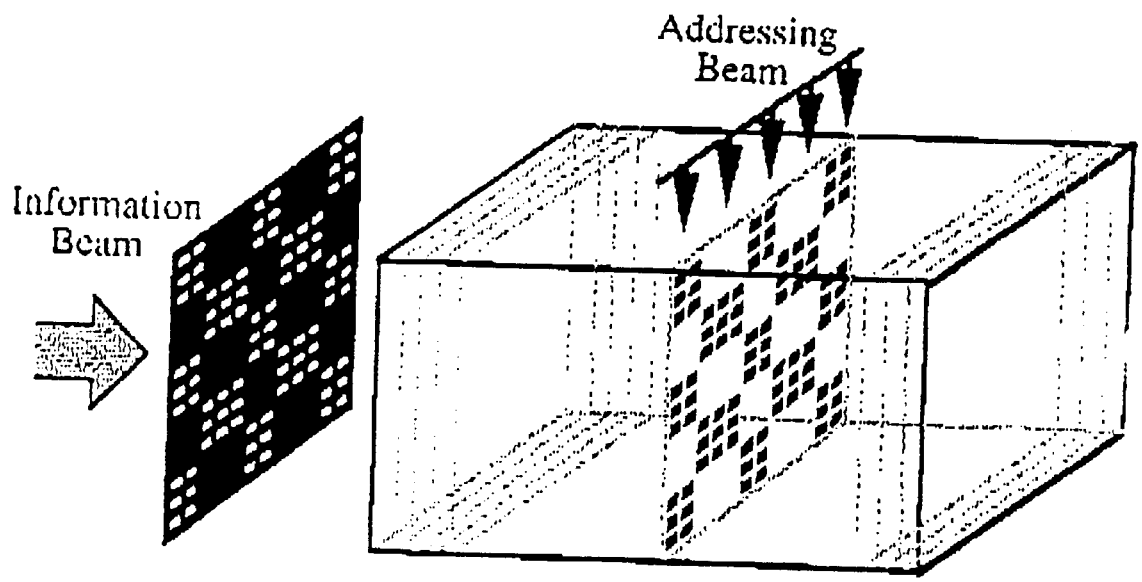
FIG. 8a is a diagrammatic illustration of the storing and accessing of information in an optical memory by two-photon interaction.
Figure 8B:
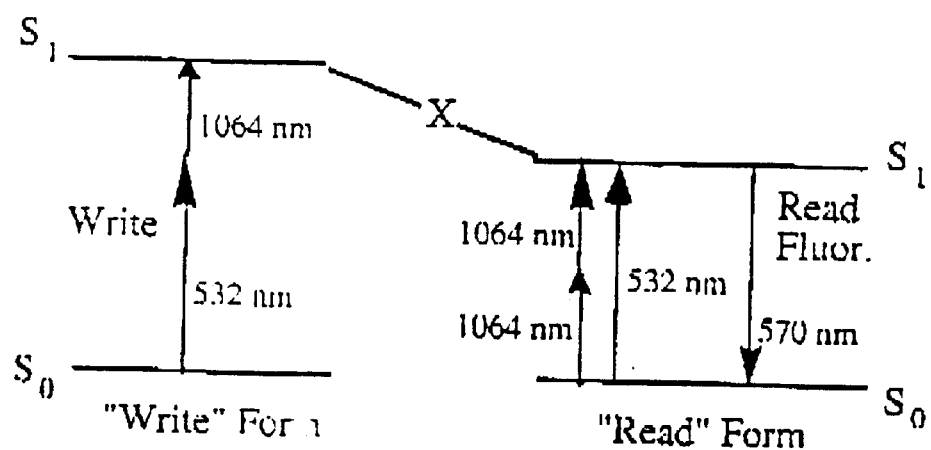
FIG. 8b is an energy level diagram appropriate to the optical memory of FIG. 8a, and the chemicals and photochemicals of the present invention.

Selection of voxels within a 3D volume is achieved by means of two photon absorption process previously described by the inventors, and the subject of a patent of one inventor. See Dvornikov, A. S.; Rentzepis, P. M. *Optics Communications*, 136 (1997). Briefly, two pulsed beams intersect each other inside the bulk of the device as shown schematically in FIG. 8a. Neither beam has enough energy—i.e., the wavelength is too long—to, individually excite the molecule to an excited state. However, when the two beams intersect then their combined energies are sufficient to populate the first excited state. This is shown by means of an energy level diagram in FIG. 8b. Subsequent photochemistry transforms the original molecule to the "written" form corresponding to a "1" in the binary code. The information is accessed by exciting the "written" form to its first excited singlet state and recording its fluorescence by means of a CCD. Subsequently the information is digitized and processed as the information from a magnetic disk. In addition to the fact that a huge amount of information may be stored, i.e., $10^{12}$ b/cm$^3$, the information can be stored and accessed in parallel, i.e. a complete 100 Mb disk may be stored and accessed simultaneously, rather than by the normal bit-by-bit process.

The 3D memory based on NNA is by design a WORM device, where information can be written once only but can be accessed many times. The process of making a memory device consists of dispersing nitro-naphthaldehyde and rhodamine B base within a matrix in the form of, most typically, a cube (of, for example, 1 cm³) or a thick disk (of, for example, a 8 cm (3") diameter by a 1.25 cm (½") thickness). The rhodamine B base corresponds to the "write" form, "0" in the binary code. The cube or disk is irradiated with 532 nm and 1064 nm ps laser pulses shaped into 8 mm²×20 µm thick plane beam. The 1064 nm information beam passes through an SLM (spatial light modulator) which contains the information to be stored, and propagates through the cube. The 532 nm, reference, beam propagates also into the cube following an optical path perpendicular to the information beam. Where the two beams intersect light is absorbed, NNA generates nitroso acid, and photochemistry induces the Rhodamine B base to become Rhodamine B which is the "read" form corresponding to 1 in the binary code:

Rhodamine B when excited fluoresces very strongly. More precisely, its quantum efficiency is approximately 1. Therefore it is very well suited for accessing information. Reading is achieved by exciting a page with a 532 nm plane beam and recording the Rhodamine B fluorescence.

Using these materials and the two photon method described here briefly, the inventors and their collaborators have been able to store in the bulk of a 1 cm³ cube more than one hundred 2 D disks (pages) each containing 10 Mb/disk of information. See Dvornikov, A. S.; Rentzepis, P. M., *Optics Communications*, 136 (1997); Dvornikov, A. S.; Rentzepis, P. M., *Res. Chem. Intermed.*, 22 (1996) 115; and Dvornikov, A. S., Cokgor, I., Wang, M., McCormick, F. B., Esener, S. E. and Rentzepis, P. M., *IEEE-CPMT—Part A*, 20, (1997) 203.

Figure 11A:
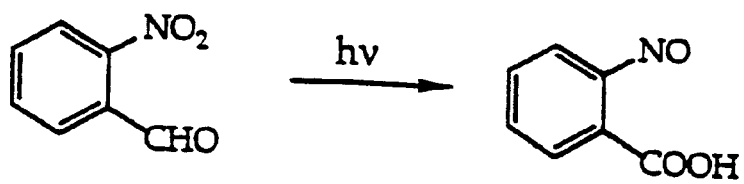
FIG. 11, consisting of FIGS. 11a through 11e, show various chemical and radiation responses of the constituent chemicals and photochemicals of the present invention.
Figure 11B:
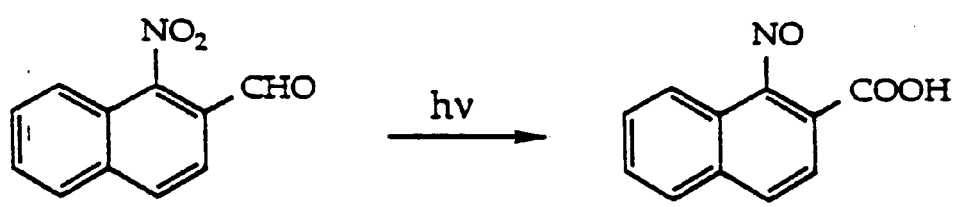
Figure 11E:
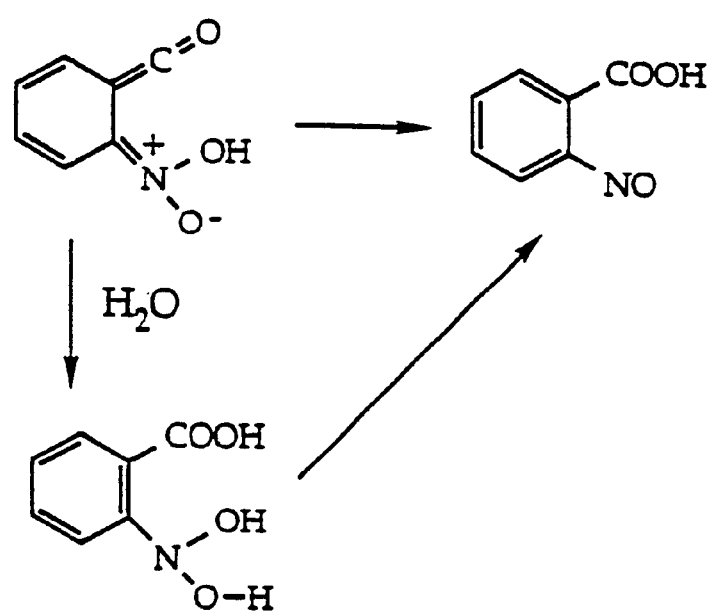
Figure 11D:
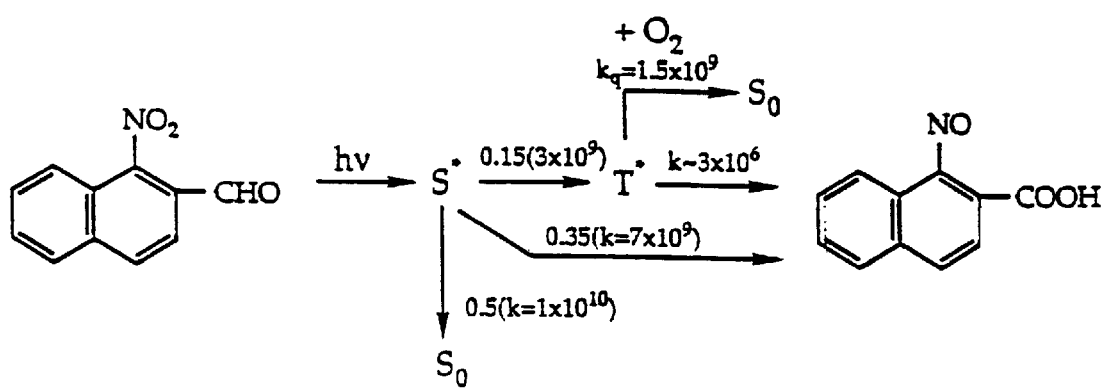
Figure 11E:
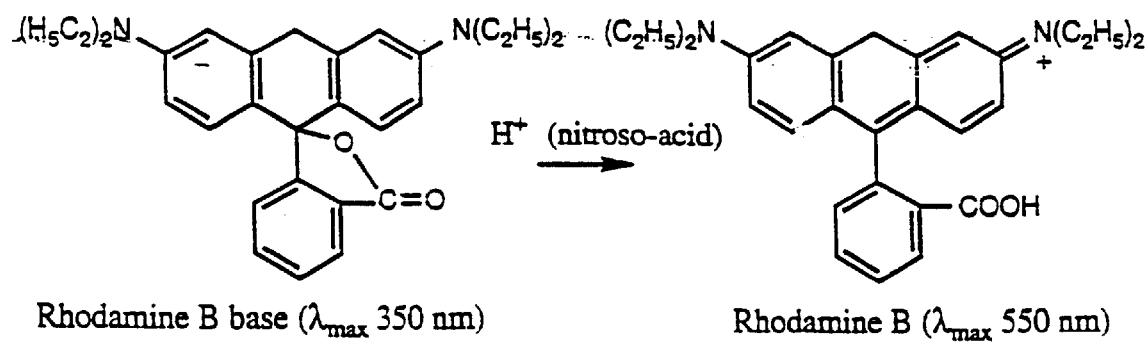

The chemical and radiation responses of the constituent chemicals and photochemicals of the present invention are summarized in FIGS. 11a through 11e. FIG. 11a shows the phtoisomerization of aromic nitro compounds to nitroso compounds, as previously reported in the literature. FIG. 11b shows the phototransformation of NNA into a corresponding nitroso acid. FIG. 11c shows the photoreaction of intermediate product o-nitrobenzaldehyde in the presence of water. FIG. 11d shows the photolysis of NNA. FIG. 11e shows the chemical transformation of dye precursor Rhodamine B base into dye Rhodamine B in the presence of nitroso acid.

Still other acid generators and chemical amplifiers are suitable. For example, onium salts such as triphenylsulfonium tetrafluroborate and diphenyliodonium tetrafluoroborate are suitable.

4. Conclusion

The-phototransformation of NNA into nitroso acid is shown to proceed via both singlet $^1n\pi^*$ and triplet $^3\pi\pi^*$ excited states. The quantum yield is rather insensitive to the polarity of the solvent and excitation light wavelength. The lifetime of the $^3\pi\pi^*$ triplet state was found to increase with increasing solvent polarity and in highly polar solvents was long enough to allow the triplet state to be quenched by oxygen. The decrease of the photo reaction quantum yield in the presence of oxygen was also measured.

At low temperatures, .i.e., 77° K., the photo reaction of NNA was found to proceed with considerably lower quantum yield, while a bright phosphorescence was detected and found to be the dominant deactivation channel of the triplet excited state. Based on experimental data and literature data available, a mechanism for the phototransformation of 1-nitro-2-naphthaldehyde into nitroso acid is proposed. This material forms the basis for a novel 3D storage computer memory device.

NNA has been utilized as an acid generator in photochromic memory material, composed of NNA and Rhodamine B base dispersed in a PMMA host. The application of this new memory material to optical memory stores, and, particularly, to 3D optical storage devices with such memory stores, has been demonstrated.

In accordance with the preceding explanation, variations and adaptations of the chemical and photochemical admixtures, and the optical memory stores realizable with these admixtures, in accordance with the present invention will suggest themselves to a practitioner of the chemical, photochemical and/or optical/radiation memory arts.

For example, once the concept of changing a first, photosensitive, chemical so as to react with a second, dye precursor, chemical in order to form a stable dye is understood, than it is a straightforward matter to search, first, for (i) any dye that can be made by combination with any of acids, bases, ions, radicals and/or excited molecules from some dye precursor and then, second, for (ii) some means of photochemically making—possibly in more than one reaction step—the acids, bases, ions or radicals, and/or excited molecules with which the dye precursor is reactive.

For example, the phototransformation step can be indirect. Consider activation by light of a molecule that subsequently transfers its energy (as was received by the light radiation) to yet another, "next", molecule. This "next" molecule then undergoes phototransformation to another form, which other form is reactive with the dye precursor molecule to form the dye.

For example, and as already tangentially mentioned, the written form of the chemical can be either the fluorescing (as is the preferred embodiment taught herein), or, alternatively, the non-fluorescing, of two complimentary forms. In each case, the initial, un-written, form—whether fluorescing or not—is normally designated as binary "0" while the opposite, written, form is designated as binary "1".

For example, it may be contemplated that other sets of (i) dye precursor and (ii) generator molecules could be found, and used, so as to, when radiatively stimulated, chemically react together to generate a material that would and could subsequently be radiatively stimulated to fluoresce. However, and as a more radical extension of the present invention, the "end item" to be sought might not be flourescence, but electrical conductivity in a sort of optically-stimulated electrically-interrogated memory. In this case a set of (i) precursor molecules to the creation of an electrically conductive molecules and (ii) generator molecules responsive to radiation for producing something—an acid, perhaps for changing the precursor molecules into their electrically conductive state, would be sought, and used. In other words, this chemical/photochemical pair would, when radiatively stimulated, chemically react together to generate a material that would, when subsequently radiatively stimulated, exhibit discernable electrical —and not (necessarily) optical—properties.

It will thus be recognized that the present invention spans many photochemical, and chemical, combinations that are within the spirit of the invention for stably inducing a radiation-detectable (i.e., readable) change in some first molecules within a domain, or voxel, in response to the radiation-induced phototransformation of second molecules co-occupying the same domain (i.e., writing).

In accordance with these and other possible variations and adaptations of the present invention, the scope of the invention should be determined in accordance with the following claims, only, and not solely in accordance with that embodiment within which the invention has been taught.

What is claimed is:

1. An admixture, suitable for use in two-photo optical memories, consisting essentially of:

dye precursor molecules reactive with an acid to produce dye molecules having differing spectroscopic properties than do the dye precursor molecules;

a chemical suitably chemically reacted to form the acid with which the dye precursor molecules are reactive, the chemical comprising an H-donor; and light-sensitive molecules that, when exposed to first photons of a first frequency, are elevated to a first singlet or triplet state in which the ling-sensitive molecules are non reactive, but that further, upon quantum-mechanically-simultaneous-absorption of second photons of a second frequency, become excited to a higher singlet or triplet state, as the case may be, from which higher states the light-sensitive molecules then and only then, undergo photochemical reaction with the chemical so as to form the acid with which the dye precursor molecules are reactive, the light sensitive molecules consisting essentially of 2-bromo-naphthalene, which 2-bromo-naphthalene is stable, in its first singlet and triplet excited states but which 2-bromo-naphthalene undergoes photo dissociation into bromine and naphthyl radicals from its highest electron excited states, forming the HBr acid molecule by extracting a hydrogen atom from the H-donors;

wherein the dye precursor molecules are reactive with the acid that is photo generated in the presence of both first and second photons from the light-sensitive molecules to form the dye molecules;

wherein, more specifically, the dye precursor molecules are reactive with the HBr, resultant from a chain reaction of both photo generation and photo dissociation proceeding from both first and second photons from the light-sensitive molecules, to form the dye molecules.

* * * * *